United States Patent [19]
Storm et al.

[11] Patent Number: 5,884,067
[45] Date of Patent: Mar. 16, 1999

[54] MEMORY CONTROLLER FOR CONTROLLING DIFFERENT MEMORY TYPES AND GENERATING UNCORRECTABLE ERROR FAULTS WHEN AN ACCESS OPERATION IS PERFORMED TO A WRONG TYPE

[76] Inventors: Shawn Fontaine Storm, 338 Oak St. Apt. 9; Bradley W. Hoffert, 338 Oak St. Apt. 1, both of Mountain View, Calif. 94041; Mark A. Loomis, 730 E. Evelyn Ave. Apt. 736, Sunnyvale, Calif. 94086

[21] Appl. No.: 549,324

[22] Filed: Oct. 27, 1995

Related U.S. Application Data

[63] Continuation of Ser. No. 995,071, Dec. 22, 1992, abandoned.

[51] Int. Cl.$^6$ .................................................. G06F 3/14
[52] U.S. Cl. ........................... 395/511; 395/433; 395/494
[58] Field of Search .................................. 395/307, 433, 395/444, 405, 431, 432, 437, 445, 494, 250, 872, 800, 114, 115, 509, 510, 328, 526, 511, 182.06, 185.01, 517; 365/222; 371/40.4, 49.2; 345/202

[56] References Cited

U.S. PATENT DOCUMENTS

| | | | |
|---|---|---|---|
| 4,316,244 | 2/1982 | Grondalski | 395/495 |
| 4,366,538 | 12/1982 | Johnson et al. | 395/494 |
| 4,672,609 | 6/1987 | Humphrey et al. | 371/21.2 |
| 4,679,139 | 7/1987 | Durbin | 395/601 |
| 4,682,284 | 7/1987 | Schrofer et al. | 395/875 |
| 4,878,166 | 10/1989 | Johnson et al. | 395/307 |
| 4,899,146 | 2/1990 | Podolak et al. | 341/51 |
| 4,965,723 | 10/1990 | Kirk et al. | 395/307 |
| 4,980,850 | 12/1990 | Morgan | 395/497.03 |
| 5,113,369 | 5/1992 | Kinoshita | 395/307 |
| 5,162,788 | 11/1992 | Lundblad et al. | 345/200 |
| 5,185,878 | 2/1993 | Baror et al. | 395/450 |
| 5,241,642 | 8/1993 | Norsworthy et al. | 395/508 |
| 5,251,298 | 10/1993 | Nally | 395/166 |
| 5,261,074 | 11/1993 | Solomon et al. | 395/445 |
| 5,261,080 | 11/1993 | Khoyi et al. | 395/500 |
| 5,265,231 | 11/1993 | Nuwaysen | 395/433 |
| 5,287,478 | 2/1994 | Johnston et al. | 395/438 |
| 5,301,278 | 4/1994 | Bowater et al. | 395/405 |
| 5,323,489 | 6/1994 | Bird | 395/494 |
| 5,325,513 | 6/1994 | Tanaka et al. | 395/500 |
| 5,357,621 | 10/1994 | Cox | 395/497.03 |
| 5,388,207 | 2/1995 | Chia et al. | 395/164 |
| 5,404,480 | 4/1995 | Suzuki | 395/444 |
| 5,454,091 | 9/1995 | Sites et al. | 395/413 |
| 5,471,632 | 11/1995 | Gavin et al. | 395/284 |
| 5,546,553 | 8/1996 | Robertson et al. | 395/405 |

*Primary Examiner*—Eddie P. Chan
*Assistant Examiner*—Hiep T. Nguyen

[57] ABSTRACT

A memory controller method and apparatus wherein data to be written to a memory device is stored in a data queue, the data queue has a plurality of entries wherein at least two of the entries are combined to store a single datum, the single datum is wider than a single entry of the entries and addresses associated with the stored data of the data queue are stored in an address queue, thereby providing a circular write buffer. Specific memory modules of a plurality of memory modules to be refreshed are indicated to a refresh controller to thereby selectively control which of the memory modules are refreshed by the refresh controller. Access is controlled to the plurality of memory modules, each of the memory modules having an associated type. Configuration status information indicating the associated type for each of the memory modules is stored so that, if an access operation is performed to a wrong type, uncorrectable error faults are generated and can be detected. Planar data packing is performed by receiving a plurality of unpacked video data from the memory device, each of the unpacked video data having at least two channels of information, and packing the unpacked video data into packed video data by stripping at least one channel from each of the plurality of unpacked video data and then combining any remaining unstripped channel data, prior to sending the packed video data to a bus master. Planar data unpacking is performed by receiving the packed video data from the bus master, the packed video data having at least one missing channel of the at least two channels of the unpacked video data, and then expanding the packed video data to unpacked video data for storage in the memory device, thereby providing video data translation.

12 Claims, 12 Drawing Sheets

ADDRESS/DATA/CONTROL PATH DESCRIPTION

| PATH | WIDTH | DESCRIPTION |
|---|---|---|
| 201 | [64] | ADDRESS/DATA FROM REGISTERED MBUS MAD TO WRITE BUFFERS (WB), CONTROL STATE MACHINES (CSM), AND THE CONTROL STATUS REGISTERS (CSRS). GRAPHICS SHARES THIS PATH FOR INPUT FROM THE MBUS. |
| 202 | [64] | DATA FROM THE ECC BLOCK, FLOW-THROUGH OR CORRECTED-MODE, TO GRAPHICS DATA IN, AND TO REGISTERED MBUS MAD DRIVER. |
| 203 | [64] | DIAGNOSTIC INFO READ PATH FROM THE CSRS TO THE MBUS, TO THE CSMS AND TO HALF THE REGISTERED 16B CHECK BIT WRITE ENABLE BUS (CBW). |
| 204 | [64] | ADDRESS FROM THE ADDRESS QUEUE TO CSR AND TO RAM ADDRESS SHIFT/COMPARE. |
| 205 | [32] | ARBITRATION STATE CONTROL (ASM) FROM THE CSR SETTINGS, SATELLITE STATE MACHINE CONTROL AND DATA FOR FAULT STATUS, DIAGNOSTICS, AND VIDEO CONFIGURATION. |
| 206 | [6] | SYNCHRONOUS INTERFACE FOR THE SLAVE MBUS CONTROL SIGNALS. |
| 207 | [3] | THE ECC BLOCK INTERFACE TO THE ASM. IT SELECTS DATA CORRECT OR FLOW THROUGH MODE. THE ECC BLOCK RELAYS THE DATA INTEGRITY TO THE CSM. |
| 208 | [8] | CONTROL SIGNALS FORM THE CSM TO THE WB. IT CHANNELS THE MBUS MAD TO AND FROM AVAILABLE BUFFER LOCATION; SELECTS ADDRESS/DATA OUTPUT. |
| 209 | [24] | MULTIPLEXED ROW/COLUMN ADDRESS FOR THE DRAM/VRAM. |
| 210 | [64] | DATA FROM THE WB, (GRAPHICS WRITE DATA,) AND RMW COMPOSING (USING CHANNEL MODE, BYTE MASK, AND BIT MASK INFO), DRIVEN TO 64B OF THE REGISTERED RAM DATA BUS (128B AND THROUGH THE ECC GENERATE BLOCK. |
| 211 | [8] | MUX DRIVEN BY EITHER THE DIAGNOSTICS REGISTER OR HALF THE DRAM'S 16B FOR THE ECC DATA INTEGRITY CHECK. |
| 212 | [8] | VRAM BYTE WRITE ENABLES. DURING A VRAM ACCESS, THESE SIGNALS REPLACE THE DRAM CHECK BIT INFORMATION; TO HALF THE REGISTERED 16B CBW BUS. |
| 213 | [8] | CHECK BITS GENERATED BY THE ECC BLOCK, TO HALF THE REGISTERED 16B CBW BUS, FOR APPENDING TO DRAM DATA, ALSO GENERATES THE SYNDROME FOR UPDATING THE FAULT REGISTERS. |
| 214 | [64] | DATA FROM THE REGISTERED RAM DATA BUS SELECTED FROM THE 128 BIT CAPTURED DATA TO THE ECC CHECK MODULE AND EITHER FLOWS THROUGH OR IS CORRECTED IN THE ECC CORRECTION MODULE, AND COMPOSED DATA PATHS. |
| 215 | [4] | CONTROL PATH TO AND FROM THE MDI. |
| 216 | [18] | DRAM/VRAM ACCESS CONTROL FROM THE CSM; RAS, CAS, WE. |
| (217 | [64] | GRAPHICS DATA PATH FOR FULL AND PARTIAL WRITES.) |
| (218 | [64] | GRAPHICS MBUS MAD OUTPUT.) |
| (219 | [32] | GRAPHICS ADDRESS FOR MEMORY OPERATIONS.) |
| 220 | [4] | JTAG INTERFACE PATH TO FLIP FLOPS AND BOUNDARY REGISTERS; AND RESETS. |
| 221 | [32] | CHANNEL READ COMPOSED FOR THE MBUS BUFFER. |
| 222 | [32] | UPACK VRAM PIXEL DATA TO PIPELINED OUTPUT BUFFER. |
| 223 | [17] | VIO SHARED CBW ADDRESS, DATA, WE_CONTROLS. |
| (224 | [10] | GRAPHICS SHARED MBUS CONTROLS.) |
| 225 | [3] | DECODED MAS CYCLE ADDRESS FOR VALID OR ACCESS-ERROR MBUS RESPONSE. |

*FIG. 3B*

PINOUT

SIGNAL NAMES APPENDED WITH "_" ARE ACTIVE LOW.

| NAME | I/O | DESCRIPTION |
|---|---|---|
| MBUS INTERFACE - 72 | | |
| MAD[64] | I/O | MBUS ADDRESS/DATA BUS |
| MAS_ | I | MBUS ADDRESS STROBE |
| MRDY_ | O | MBUS ACKNOWLEDGE |
| MERR_ | O | MBUS ERROR |
| MRTY_ | O | MBUS RETRY |
| MBB_ | I | MBUS BUSY |
| MIH_ | I | MBUS INHIBIT |
| MCLK | I | SYSTEM CLOCK |
| AERR_ | O | ASYNCHRONOUS ERROR |
| DRAM/VRAM INTERFACE - 168 | | |
| D[128] | I/O | MEMORY DATA |
| CBWL[7:0] | I/O | CHECK BITS FOR DRAM; VRAM BYTE_WE AND VIO ADDRESS/DATA |
| CBWH[15:8] | I/O | CHECK BITS FOR DRAM; VRAM BYTE_WE AND VIO WE_[8] |
| A[12] | O | MUXED ROW/COL ADDRESS (4M ADDRESSES) |
| RAS_[8] | O | RAS |
| CAS_[2] | O | CAS |
| WE_ | O | DRAM WRITE ENABLE |
| ROE_ | O | RAM OUTPUT ENABLE |
| VIDEO INTERFACE - 3 | | |
| VBSY0_ | I | VIDEO BUSY FROM VRAM SIMMS [RAS 4,6] |
| VBSY1_ | I | VIDEO BUSY FROM VRAM SIMMS [RAS 5,7] |
| IOSEL_ | O | VIO SPACE QUALIFIER |
| MISCELLANEOUS - 8 | | |
| JTAGDI | I | JTAG BOUNDARY SCAN DATA IN |
| JTAGTMS | I | JTAG BOUNDARY SCAN MODE SELECT |
| JTAGCLK | I | JTAG CLOCK |
| JTAGDO | O | JTAG BOUNDARY SCAN DATA OUT |
| ACONFIG | I | ADDRESS CONFIGURATION |
| TN | I | TEST MODE TRI-STATE DISABLE |
| PO | O | PARAMETRIC TEST OUTPUT |
| RESET_ | I | SAMPLED MASTER RESET (RESET 3 CLOCKS AFTER ASSERTION) |
| TOTAL I/O PINS: | | 251 |
| POWER / GROUND - 48 | | |
| VDD | | 21 POWER |
| VSS | | 27 GROUND |
| TOTAL PINS: | | 299 |

*FIG. 3C*

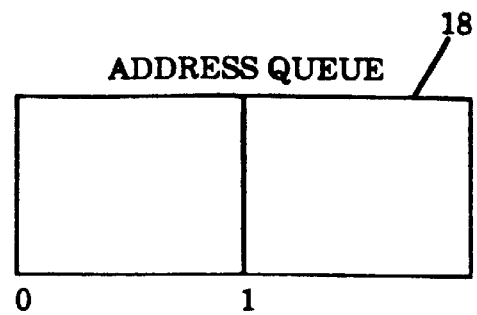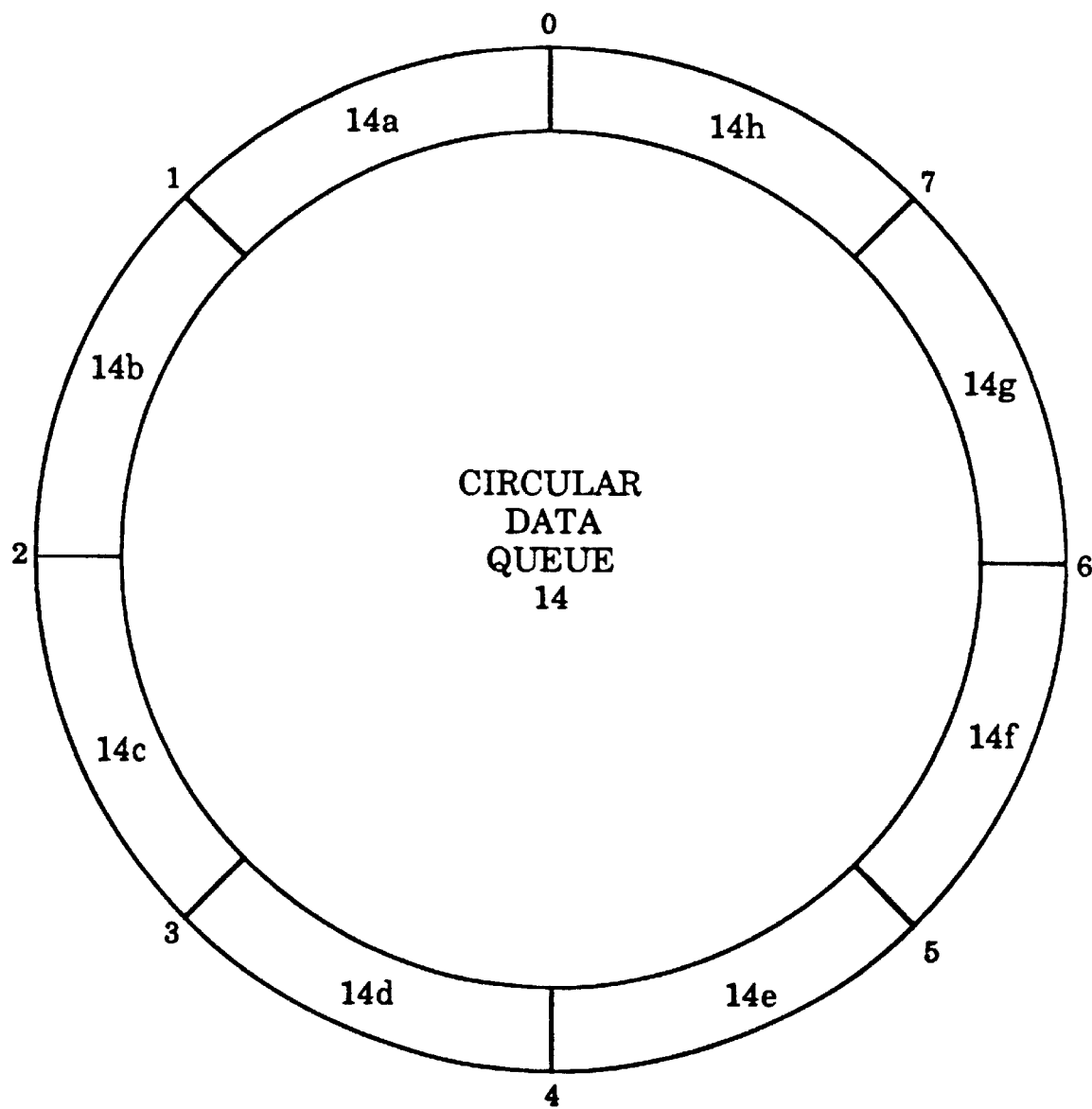
*FIG. 5*

|        |      |      |        |          |
|--------|------|------|--------|----------|
|        | CAS0 | RAS0 | SIDE A | DRAM     |
|        | CAS1 | RAS0 | SIDE B | SLOT 0   |
| VBSY0  | CAS0 | RAS4 | SIDE A | DRAM/VRAM |
|        | CAS1 | RAS4 | SIDE B | SLOT 1   |
|        | CAS0 | RAS1 | SIDE A | DRAM     |
|        | CAS1 | RAS1 | SIDE B | SLOT 2   |
| VBSY1  | CAS0 | RAS5 | SIDE A | DRAM/VRAM |
|        | CAS1 | RAS5 | SIDE B | SLOT 3   |
|        | CAS0 | RAS2 | SIDE A | DRAM     |
|        | CAS1 | RAS2 | SIDE B | SLOT 4   |
| VBSY0  | CAS0 | RAS6 | SIDE A | DRAM/VRAM |
|        | CAS1 | RAS6 | SIDE B | SLOT 5   |
|        | CAS0 | RAS3 | SIDE A | DRAM     |
|        | CAS1 | RAS3 | SIDE B | SLOT 6   |
| VBSY1  | CAS0 | RAS7 | SIDE A | DRAM/VRAM |
|        | CAS1 | RAS7 | SIDE B | SLOT 7   |

*FIG. 6*

MEMORY ADDRESS DEFINITIONS

| A[12] | <=64MB DRAM | | 2MB VRAM | | 4MB VRAM | | 8/16MB VRAM | | VIO | |
|---|---|---|---|---|---|---|---|---|---|---|
| | ROW | COL | ROW | COL | ROW | COL | ROW | COL | DEVICE-CONTROLS | |
| MA0 | A13 | A4 | A13 | A4 | A13 | A4 | A14 | A5 | PCG0 | |
| MA1 | A14 | A5 | A14 | A5 | A14 | A5 | A15 | A6 | PCG1 | |
| MA2 | A15 | A6 | A15 | A6 | A15 | A6 | A16 | A7 | PCG2 | |
| MA3 | A16 | A7 | A16 | A7 | A16 | A7 | A17 | A8 | PCG3 | |
| MA4 | A17 | A8 | A17 | A8 | A17 | A8 | A18 | A9 | DAC0 | |
| MA5 | A18 | A9 | A18 | A9 | A18 | A9 | A19 | A10 | DAC1 | |
| MA6 | A19 | A10 | A19 | A10 | A19 | A10 | A20 | A11 | RESERVED | |
| MA7 | A20 | A11 | A20 | A11 | A20 | A11 | A21 | A12 | MDI/VBC0 | |
| MA8 | A21 | A12 | A12 | | A21 | A12 | A22 | A13 | MDI/VBC1 | |
| MA9 | A23 | A22 | | | | | A23 | | RESERVED | |
| MA10 | A25 | A24 | | | | | | | | |
| MA11 | A24 | | | | | | | | | |

*FIG. 7*

FIG. 8A
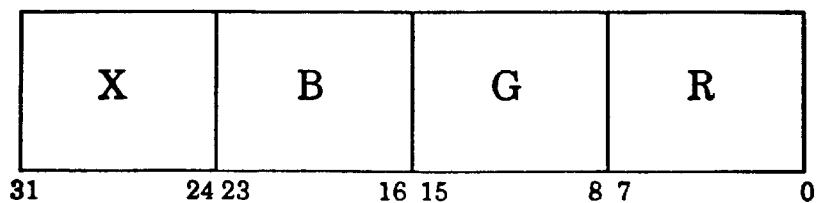
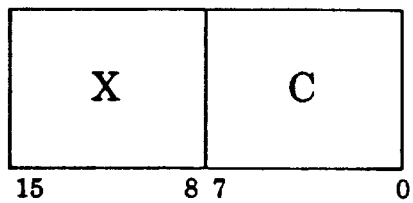
FIG. 8B
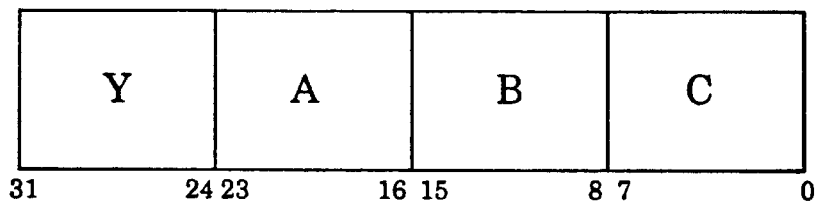
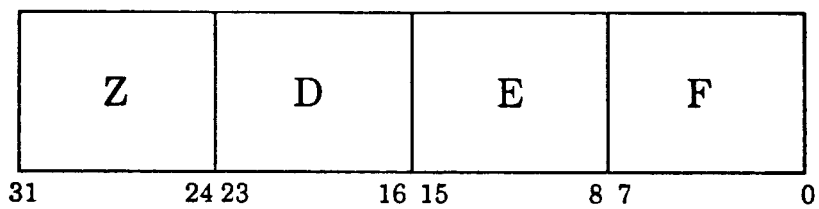
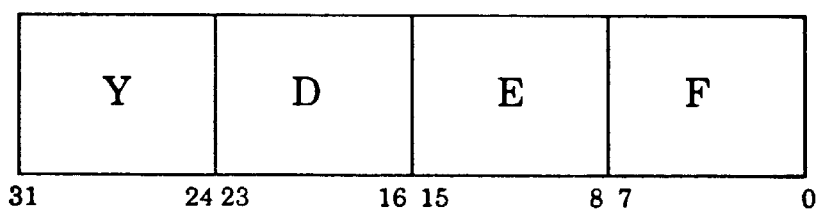
FIG. 8C
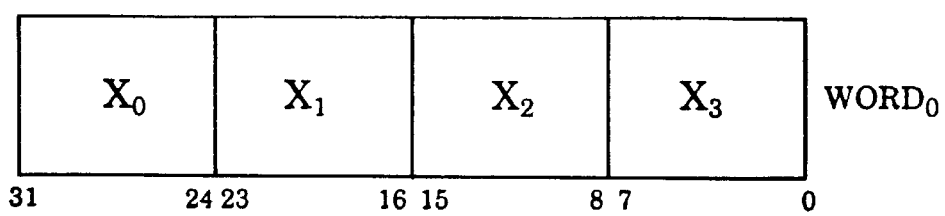
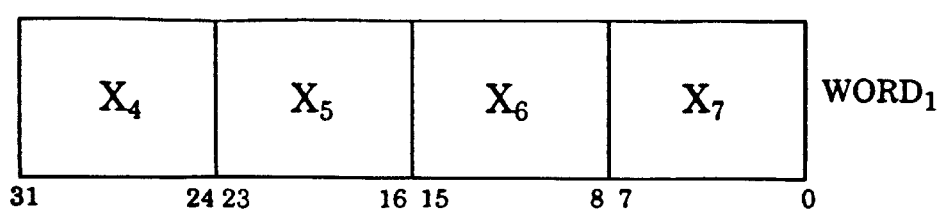

LEGEND:
N - NO ERROR DETECTED  D - DOUBLE ERROR ACROSS 8B  T - TRIPLE ERROR IN NIBBLE
                       Q - QUAD ERROR IN NIBBLE      M - MULTIPLE ERRORS
                       # - DATA BIT IN ERROR         C# - CHECK BIT IN ERROR

SH: S[7:4], SL: S[3:0]

| SL\SH | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| 0 | N | C4 | C5 | D | C6 | D | D | T | C7 | D | D | T | T | T | T | Q |
| 1 | C0 | D | D | 0 | D | 25 | M | D | D | 5 | 17 | D | D | D | D | 12 |
| 2 | C1 | D | 33 | 1 | D | 29 | 36 | D | D | M | 21 | D | D | D | D | 9 |
| 3 | D | 32 | D | 10 | 42 | D | D | M | 47 | D | D | M | T | T | T | D |
| 4 | C2 | D | 61 | D | 59 | 27 | 7 | D | D | M | 19 | D | M | D | D | 14 |
| 5 | D | 57 | 4 | D | 39 | Q | D | 22 | 63 | D | Q | 30 | M | M | M | D |
| 6 | D | M | D | M | D | D | 54 | D | M | 50 | D | D | D | 16 | 24 | D |
| 7 | T | D | D | 15 | D | 31 | M | 18 | 6 | 38 | 23 | 26 | T | D | D | 11 |
| 8 | C3 | 37 | D | D | 51 | D | D | D | 55 | D | D | M | D | 20 | 28 | D |
| 9 | D | 49 | M | D | D | Q | 62 | T | D | 58 | Q | T | M | M | M | D |
| A | D | D | 53 | T | D | M | D | D | 35 | 52 | M | D | M | M | M | M |
| B | T | 40 | 45 | T | 34 | M | 48 | D | D | D | D | T | M | M | D | D |
| C | D | D | D | D | D | D | 56 | M | D | 60 | D | D | D | D | D | M |
| D | T | D | D | T | D | M | D | M | 43 | D | M | M | M | M | D | M |
| E | T | 44 | 41 | D | 46 | D | D | M | D | D | D | D | M | M | D | M |
| F | Q | D | D | D | D | D | D | D | D | D | D | Q | D | M | M | Q |

*FIG. 9*

MEMORY CONTROLLER FOR CONTROLLING DIFFERENT MEMORY TYPES AND GENERATING UNCORRECTABLE ERROR FAULTS WHEN AN ACCESS OPERATION IS PERFORMED TO A WRONG TYPE

This is a continuation of application Ser. No. 07/995,071 filed Dec. 22, 1992, now abandonded.

BACKGROUND OF THE INVENTION

1. Related Applications

This application is related to: U.S. patent application Ser. No. 07/461,165, entitled "High Speed Active Bus", filed on Jan. 5, 1990, now abandonded; U.S. patent application Ser. No. 07/886,045, entitled "Multiple Bus Architecture", filed May 19, 1992, now U.S. Pat. No. 5,263,139 U.S. patent application Ser. No. 07/886,671, entitled "A Bus Architecture for Integrated Data and Video Memory", filed May 19, 1992, now U.S. Pat. No. 5,265,218; and U.S. patent application Ser. No. 07/886,413, entitled "Single In-Line Memory Module", filed May 19, 1992, now U.S. Pat. No. 5,270,964.

2. Field of the Invention

The present invention relates to the field of computer systems and associated memory structures. More particularly, the present invention relates to method and apparatus for memory control, specifically for controlling dynamic and video random access memory (RAM) modules.

3. Art Background

A typical computer system is comprised of a processor or CPU, a memory subsystem, an input/output subsystem, and other specialized subsystems. Communication between the processor and the subsystems is usually accomplished through one or more communication pathways known as buses. In many computer systems, the processor and subsystems are coupled for communication over a common bus.

As computer technology progresses, the performance of the processor and other subsystems improves. The improved performance in one subsystem creates the need for improved performance in the other subsystems. For example, as the performance of the processor improves, the memory or input/output subsystem is often redesigned to accommodate the improved processor performance. Similarly, as the performance of the memory subsystem improves, the processor architecture is changed to take advantage of the improved memory subsystem performance.

With the progressive performance improvements in processor, memory subsystem, and specialized subsystems, the communication pathways of the computer system often become performance "bottlenecks." In past computer systems, the communication pathway architecture was designed in response to improvements to the processor and subsystems. The performance of such systems was not easily improved without redesigning the entire system including the communication pathways.

A multiple bus architecture provides flexible communication between processors, memory subsystems, and specialized subsystems over multiple high performance communication pathways. The high performance communication pathways enable communication for multiple processors and multiple subsystems, and enables flexible upgrade to higher performance processors and subsystems.

SUMMARY OF THE INVENTION

A method and apparatus for controlling, with an application specific integrated circuit, access by at least one processor to at least one memory module over a multiple bus structure in a computer system such that the bandwidth of each bus of the multiple bus structure is utilized efficiently and the processor overhead is reduced.

In a computer system comprising a processor coupled to at least one random access memory (RAM) module, an application specific integrated circuit (ASIC) memory controller (EMC) is coupled between the processor and the memory. A multiprocessor bus couples the processor to the memory controller and a memory module bus couples the memory controller to the memory modules.

In one embodiment of the present invention, the memory bus has eight slots and each slot is capable of accepting a RAM module. The RAM modules may be of different types depending upon the type of data which each individual module will store. One kind of RAM module is dynamic RAM (DRAM) which is used for storing general purpose data. DRAM can be accessed relatively quickly. However, it is volatile, meaning that the contents in the DRAM will be lost when the power is removed, or if it is not refreshed properly. A second kind of memory module is nonvolatile static RAM (SRAM). It does not have to be refreshed and will retain data when the power is removed. The third kind of memory is video RAM. Like DRAM, VRAM is also volatile, but each VRAM module may contain its own refresh control circuitry. Furthermore, a VRAM module may contain a video input/output (V I/O) port that can be used to control video display on a monitor coupled to the module.

By using an EMC, ASIC functionality is provided that would not be available if the processor were relied upon to provide it. A configuration pin on the EMC permits the EMC to respond to multiple address spaces from a processor. Therefore, more than one EMC can be coupled to the processor bus with each EMC controlling memory modules coupled to a separate memory bus under the exclusive control of the corresponding EMC. The EMC can also be programmed to delay responses during coherent/shared accesses to account for slow (long latency) devices attached to the processor bus. The EMC also has a slot error mechanism which detects data transfer attempts to improper memory module types.

Moreover, the EMC is made to include functionality which maximizes the utilization of the processor and memory buses while relieving overhead burden of the processor.

The EMC is equipped with a circular data queue which can store data to be written to memory until the memory bus is free to transfer the data. This feature reduces the frequency with which the processor bus must stall while waiting for the memory bus to clear when data is to be written to memory.

Furthermore, the EMC can selectively perform refreshes of memory modules paired to the memory bus. This feature removes the overhead burden which results when the processor waits for refreshes of unpopulated or self-refreshed memory modules. Also, the EMC can selectively refresh memory modules paired to the memory bus, allowing two modules to be refreshed simultaneously. Moreover, only those modules that need to be refreshed, are refreshed. Therefore, the memory bus spends a minimum amount of time transferring refresh signals between the EMC and the memory modules.

Next, to ensure that the memory and processor buses are utilized efficiently and the overhead burden on the processor is relieved, the EMC can translate data transfers from one of several specialized formats to other specialized formats. In this way, video data can be transferred across the processor bus in a compressed format to the EMC. The EMC subsequently expands the compressed video data before it is stored in a VRAM module. When the video data is retrieved, the EMC recompresses it before sending it across the processor bus to the requesting processor. Thus, the amount of data to be transmitted across the processor bus is reduced. Furthermore, part of the overhead burden on the processor is relieved because the processor need not perform read-modify-write operations to store the video data.

For non-video data, the EMC adds error correcting code (ECC) check bits that are used to verify that correct data are retrieved from the memory modules. The EMC uses an error detection and correction mechanism that permits the EMC to detect errors on nibble boundaries and also to correct some errors. The EMC also has the ability to read and write check bits in memory.

For video memory modules which have video input/output (V I/O) ports, the EMC translates the transfer request which it receives from the processor bus to V I/O signals that exploit the capability of the memory bus.

Additionally, one can program the type of frame buffer that a particular memory module uses. The EMC determines when data to be written is aligned consecutively along a row of a memory module, and if so, eliminates redundant row address strobe signals. This feature reduces the overhead burden of the processor by reducing the number of clock cycles necessary to write the data across the memory bus.

BRIEF DESCRIPTION OF THE DRAWINGS

The objects, features, and advantages of the method and apparatus of the present invention will be apparent from the following detailed description of the invention in which:

FIG. 3b describes the flow of data and signals within the detailed block diagram of FIG. 3a.

FIG. 3c describes the input and output data and control signals of the detailed block diagram of FIG. 3a.

FIG. 5 illustrates a circular buffer queue for the memory controller of the present invention.

FIG. 6 illustrates a slot configuration for memory module bus slots.

FIG. 7 illustrates memory allocation for video frame buffers controlled by the memory controller of the present invention.

FIG. 8a illustrates 32 bit and 16 bit color pixel formats.

FIG. 8b illustrates chunky transfers for a 32 bit color pixel.

FIG. 8c illustrates an X channel planar transfer for a color pixel.

FIG. 9 illustrates a syndrome decode table for an error correcting code scheme used by one embodiment of the present invention.

DETAILED DESCRIPTION OF THE INVENTION

A method and apparatus for controlling memory access using an application specific integrated circuit memory controller is disclosed. In the following description, for purposes of explanation, specific numbers, materials and configurations are set forth in order to provide a thorough understanding of the present invention. However, it will be apparent to one skilled in the art that the present invention may be practiced without the specific details. In other instances, well known systems are shown in diagrammatic or block diagram form in order not to obscure the present invention unnecessarily.

Figure 1:
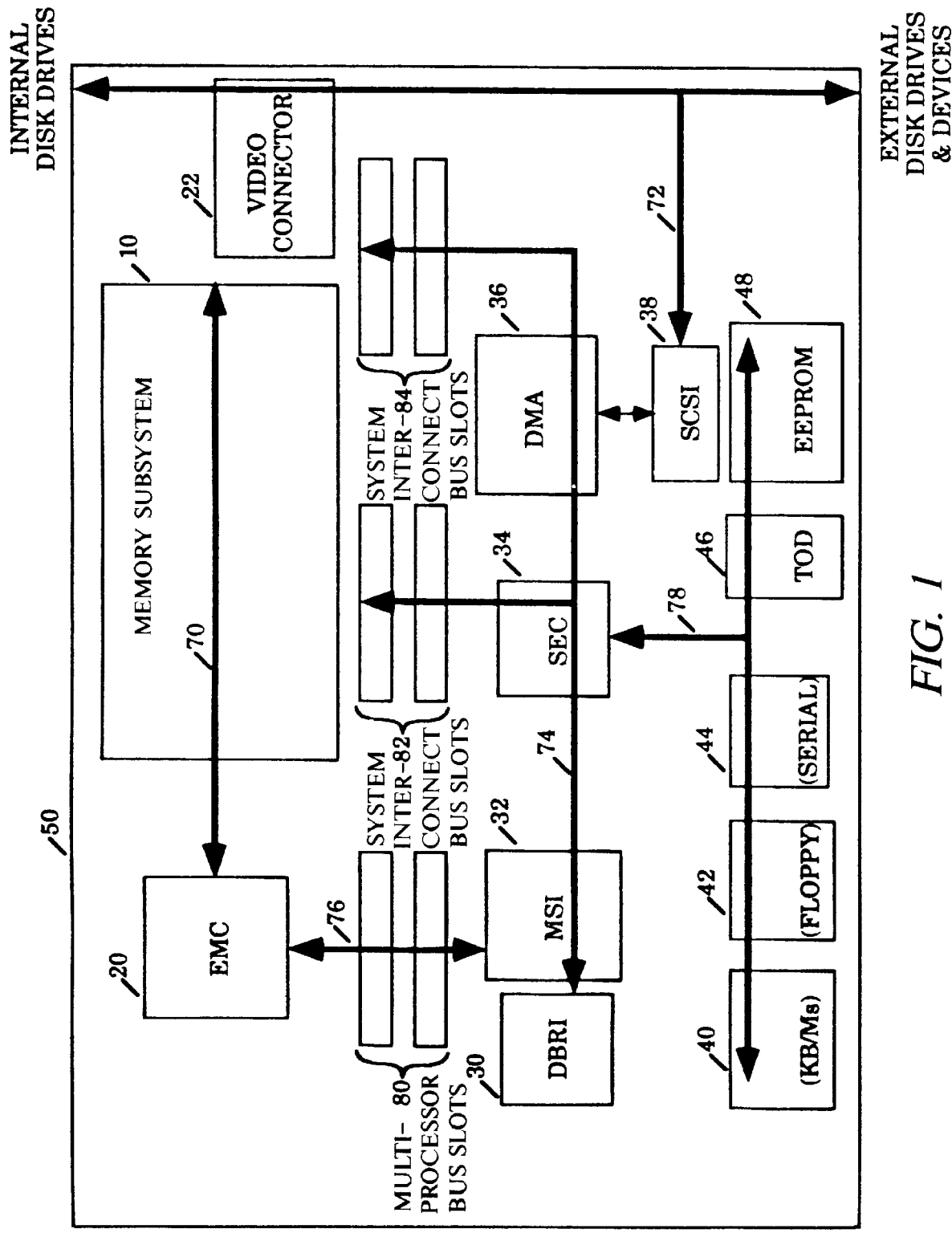
FIG. 1 illustrates a computer system having a memory controller of the present invention.

FIG. 1 illustrates a multiple bus architecture implemented on a motherboard 50 which has an application specific integrated circuit (ASIC) memory controller (EMC) 20 that uses the teachings of the present invention. The motherboard 50 provides connector slots, buses, and circuitry to establish communication pathways for processor modules, memory modules, and system interconnect modules. In the current embodiment, the motherboard 50 enables communication over a multiprocessor bus 76, a system interconnect bus 74, a memory bus 70, a small computer system interface (SCSI) bus 72, and an external bus 78.

The multiprocessor bus 76 comprises 64 multiplexed address and data lines. The multiprocessor bus 76 also implements control signal lines for coordinating master and slave transactions, and multiprocessor cache coherency operations. In addition, the multiprocessor bus 76 implements signal lines for indicating status of bus transactions. The multiprocessor bus 76 enables data transfer sizes from one byte up to 128 byte burst transfers. In one embodiment, the multiprocessor bus 76 runs at a frequency of 40 MHz.

For further discussion of a multiprocessor bus consistent with the teachings of the present invention, refer to U.S. patent application Ser. No. 07/461,165, entitled "High Speed Active Bus", filed on Jan. 5, 1990, and incorporated fully herein by reference.

The motherboard 50 contains a pair of multiprocessor bus slots 80 for coupling to processor modules (not shown). The multiprocessor bus slots 80 couple the processor modules to the multiprocessor bus 76. The motherboard 50 contains a memory controller (EMC) 20, which is coupled to the multiprocessor bus 76, and the memory bus 70. The EMC 20 enables processor modules coupled to the multiprocessor bus slots 80 to access a memory subsystem 10 over the memory bus 70. The EMC 20 receives addresses and data over the multiprocessor bus 76, and generates the row address strobe (RAS), column address strobe (CAS), and controls signals over the memory bus 70 to access the memory subsystem 10.

In the current embodiment, the memory bus 70 comprises 144 data lines including Error Correction Code (ECC lines). This is in addition to the address and control lines. The memory bus 70 runs at a maximum data transfer rate frequency of 20 MHz. The memory bus 70 delivers 144 bits of data at 20 MHz, which enables the EMC 20 to deliver 72 bits of data at 40 MHz.

For further discussion of a memory bus consistent with the teachings of the present invention, refer to related U.S. patent application Ser. No. 07/886,671, entitled "A Bus Architecture for Integrated Data and Video Memory", filed May 19, 1992, and incorporated fully herein by reference.

The memory subsystem 10 enables coupling of single in-line memory modules (SIMMs), including VRAM SIMMs (VSIMMs), DRAM SIMMs (DSIMMs), and SRAM SIMMs (SSIMMs) to the memory bus 70. The DSIMMs coupled to the memory bus 70 comprise the main memory for the motherboard 50. The VSIMMs coupled to the memory bus 70 enable video frame buffer storage. A video connector 22 provides a video output port for each of the VSIMMs. The video connector 22 enables coupling of the VSIMMs to external display monitors. The SSIMMs provide non-volatile data storage.

In one embodiment, the memory bus 70 and memory subsystem 10 enables coupling of up to 8 memory SIMMs. Each of the memory SIMMs can contain up to 64 Megabytes. The memory subsystem 10 enables coupling of up to 4 VSIMMs, thereby providing support for up to 4 display monitors.

Since the SSIMMs provide battery backup for retaining stored information during a system crash or power failure, they are particularly useful for storing disk file information maintained in main memory. A computer operating system can maintain the disk file information in a main memory portion of the memory subsystem 10 comprised of SSIMMs. After a system crash, the rebooted operating system can access the disk file information that was not stored on the disk device before the crash. Thus, SSIMMs enable an operating system to maintain the integrity of open disk files despite a system crash or power failure.

For further discussion of SIMMs consistent with the teachings of the present invention, refer to related U.S. patent application Ser. No. 07/886,413, entitled "Single In-Line Memory Module", filed May 19, 1992, and incorporated fully herein by reference.

The multiple bus architecture of the motherboard 50 enables flexible communication between processors and devices coupled to the multiprocessor bus 76, the system interconnect bus 74, the external bus 78, the SCSI bus 72, and the memory subsystem 10. Processor modules coupled to multiprocessor bus slots 80 access the memory subsystem 10 over the multiprocessor bus 76. The EMC 20 receives addresses and data from the processor modules over the multiprocessor bus 76 and accesses and data from the subsystem 10 accordingly over the memory module bus 70.

For further discussion of a multiple bus architecture consistent with the teachings of the present invention, refer to U.S. patent application Ser. No. 07/886,045, entitled "Multiple Bus Architecture", filed May 19, 1992, and incorporated fully herein by reference.

Figure 2:
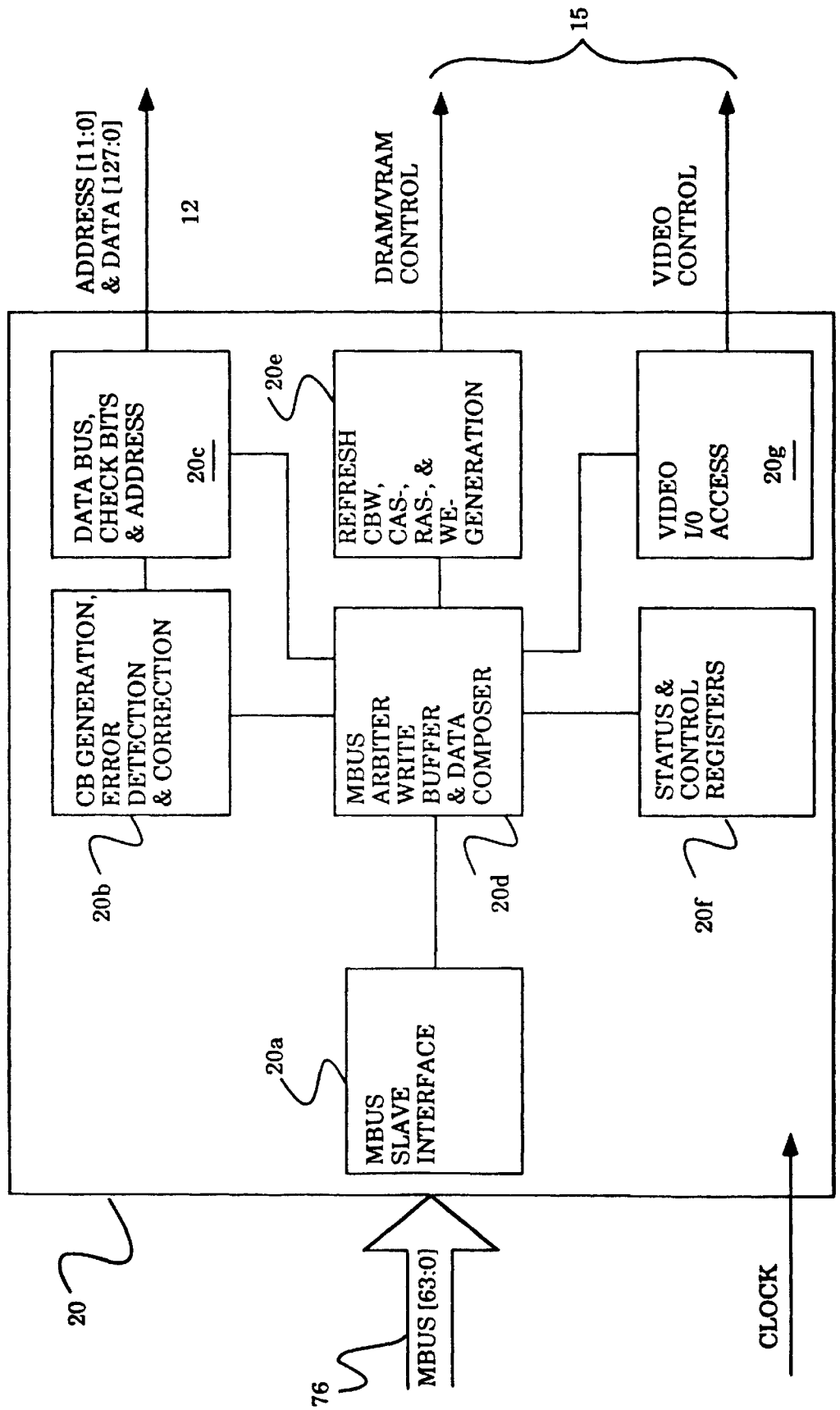
FIG. 2 illustrates a high level block diagram of the memory controller of the present invention.

FIG. 2 is a high level block diagram of the memory controller (EMC) 20 used to control access to memory devices operating on the integrated data and video memory bus shown in FIG. 1. In FIG. 2, memory controller 20 receives address and data signals transmitted over multiple processor bus 76 through multiprocessor bus (MBus) slave interface 20a. Multiprocessor bus slave interface 20a incorporates facilities to operate as an MBus slave only, and implements full Level 2 MBus protocol. After being received by multiprocessor bus slave interface 20a, data and address signals are transmitted to several internal logic blocks, and subsequently retransmitted to signal lines 12. The memory controller 20 of the current embodiment includes check-bit generation, error detection and correction block 20b, data bus, check bits and address block 20c, multiprocessor bus arbiter, write buffer and data composer block 20d, generation of control signals and refresh block 20e, status and control registers 20f and video I/O access block 20g.

The multiprocessor bus slave interface 20a shown in FIG. 2 implements the full level 2 MBus slave protocol as described in the SPARC MBus Interface Specification, Revision 1.1, subject to the following clarification. All eight MBus transaction sizes are supported. All MBus acknowledges issued by memory controller 20 are presently limited to those without MRTY- (MBus retry), because retries are not generated or serviced by the memory controller 20. However, other implementations of memory controllers may include MRTY-. During coherent transfers, reflective updates are not supported. Furthermore, coherent invalidate (CI) operations can be disabled to allow other devices to own the MBus CI acknowledge. Finally, an asserted MIH in the MIHDEL window aborts the coherent MBus transfer acknowledge and relinquishes bus ownership.

Figure 3A:
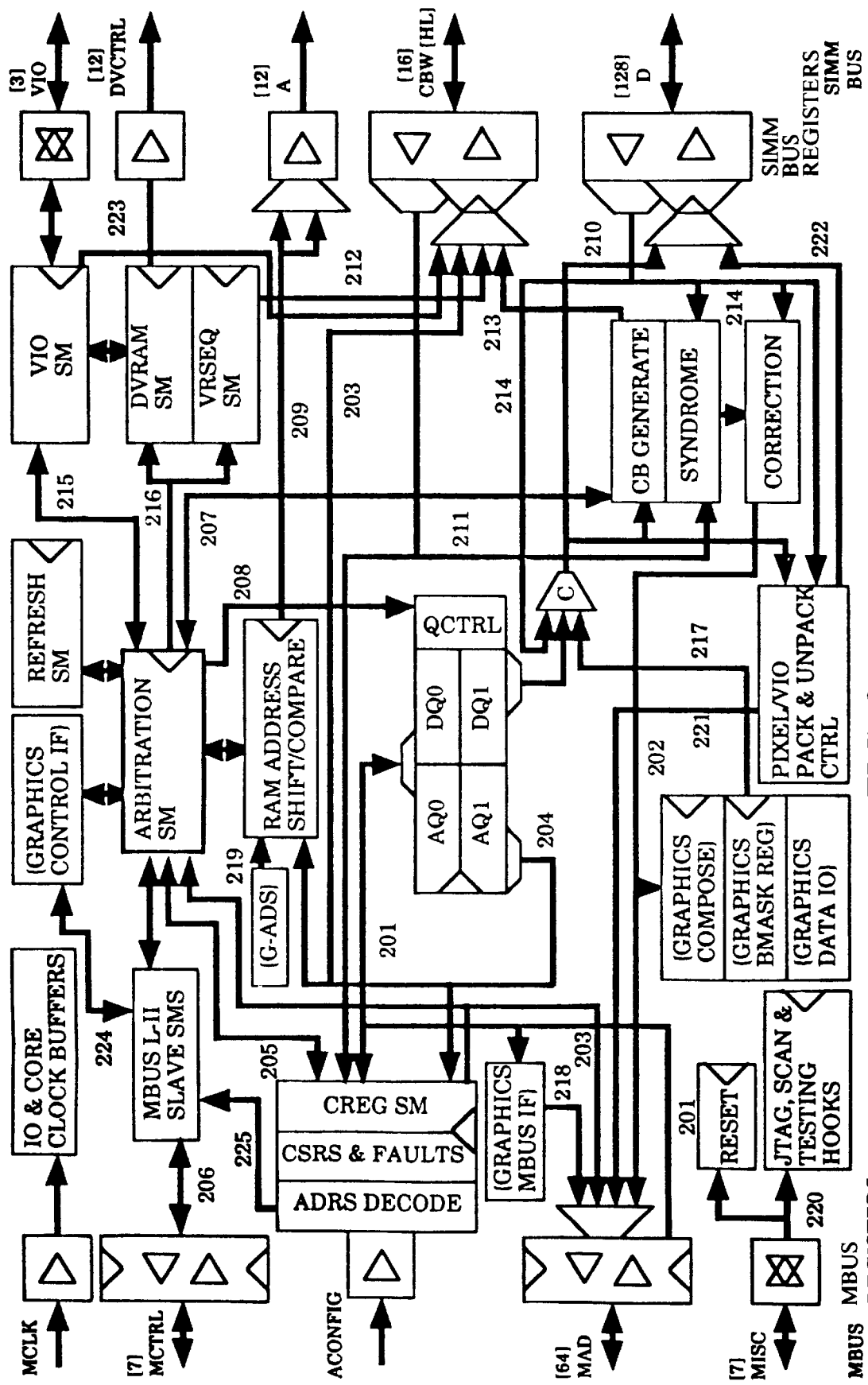
FIG. 3a illustrates a detailed block diagram of the memory controller of the present invention.

Referring briefly to FIGS. 3a–c, the flow of data and control signals related to the memory controller (EMC) 20 is depicted. FIG. 3a is a low level block diagram of the memory controller (EMC) 20 used to control access to memory devices operating on the integrated data and video memory bus shown in FIG. 1. FIG. 3b describes the flow of data and control signals within the low level block diagram of memory controller 20. FIG. 3c summarizes the input and output signals associated with the signal pins of memory controller 20.

The EMC has a configuration pin which can be set for high/low memory addressing. This permits two identical EMC parts to be coupled to the multiprocessor bus, such that each EMC has its own memory module bus and associated SIMMs. In one embodiment, each EMC coupled to the multiprocessor bus can support eight SIMMs. Therefore, by properly setting the high/low configuration pins, one can couple two memory controllers to the multiprocessor bus and have a system of 16 SIMMs. Thus, instead of the current memory capacity of 512 megabytes for eight SIMMs, one would have a gigabyte of addressable memory available to the multiprocessor bus. In this way, one can effectively double the memory available to the multiprocessor bus while maintaining the same size memory address space for a given memory module bus and its associated SIMMs.

The high/low memory space configuration feature is set by activating a pin on the EMC chip. The pin is configured on the motherboard to be pulled up or pulled down depending upon whether the high or low address space is desired for that particular instance of the chip. It is the assertion or nonassertion of the pin which tells the device what address space to acknowledge. Thus, all of the addresses are mirrored on that one bit. In a single EMC system, the default is to have that bit zero. When that bit is set to one, the EMC responds to a completely different address space. This permits a second EMC to perform the same operations as a first EMC, but to operate in a different address space so that both EMCs can reside on the same bus. If both EMCs responded to the same address space, then they both would be storing and delivering data at the same time and the data would become corrupted. This feature permits one to access a completely different SIMM with the same component, just by changing one signal.

In theory the high/low address space feature can be extended by having more than one pin designate the address configuration space for a particular EMC chip, e.g. two pins would permit up to four EMC chips to be placed on the same multiprocessor bus. However, because the multiprocessor bus interconnect is a high speed interconnect (currently 40 MHz), there is a physical limitation on the number of components which may be coupled to the multiprocessor bus while maintaining the desired operating frequency of the bus. As more of the EMC devices are added to the multiprocessor bus, the bus is loaded down, and will not run as fast. At 40 MHz, the proper trade off appears to be to have two EMCs on a single multiprocessor bus. If there were more than two EMC devices coupled to the multiprocessor bus, it would be very difficult with currently available technology to get the multiprocessor bus to run at that speed.

The multiprocessor bus address space augmented by the configuration pin is completely independent of the address space of the SIMMs of a particular memory module bus. In one embodiment, the multiprocessor bus address comes off the multiprocessor bus from the processor, or from the I/O, and is then decoded to a memory module bus address by the EMC. Thus, during an access operation, the high/low address space configuration bit is decoded by the EMC along with the rest of the address that comes over the multiprocessor bus. In this way, the high/low memory space configuration bit provides a higher address space than the address space of any set of SIMMs controlled by a single EMC.

Furthermore, the second memory module bus and second SIMM bank need not reside on the motherboard. Thus, one could have a card that plugs into the multiprocessor bus which contains a second EMC and a second set of memory. The second set of memory would not even have to be located on SIMMs. It could just be raw memory. With the right integration, the current state of the art is that a half a gigabyte could reside on a card, and that card could be used to upgrade a current system by effectively doubling the memory.

Another feature of the EMC is that the EMC permits one to programmably alter the delay in acknowledgment made by the EMC during coherent (or shared) access operations. In a coherent operation, two or more multiprocessor bus master devices (e.g. processors, I/O devices) are coupled to the multiprocessor bus and are essentially able to simultaneously access the same memory location on a given SIMM.

Figure 4:
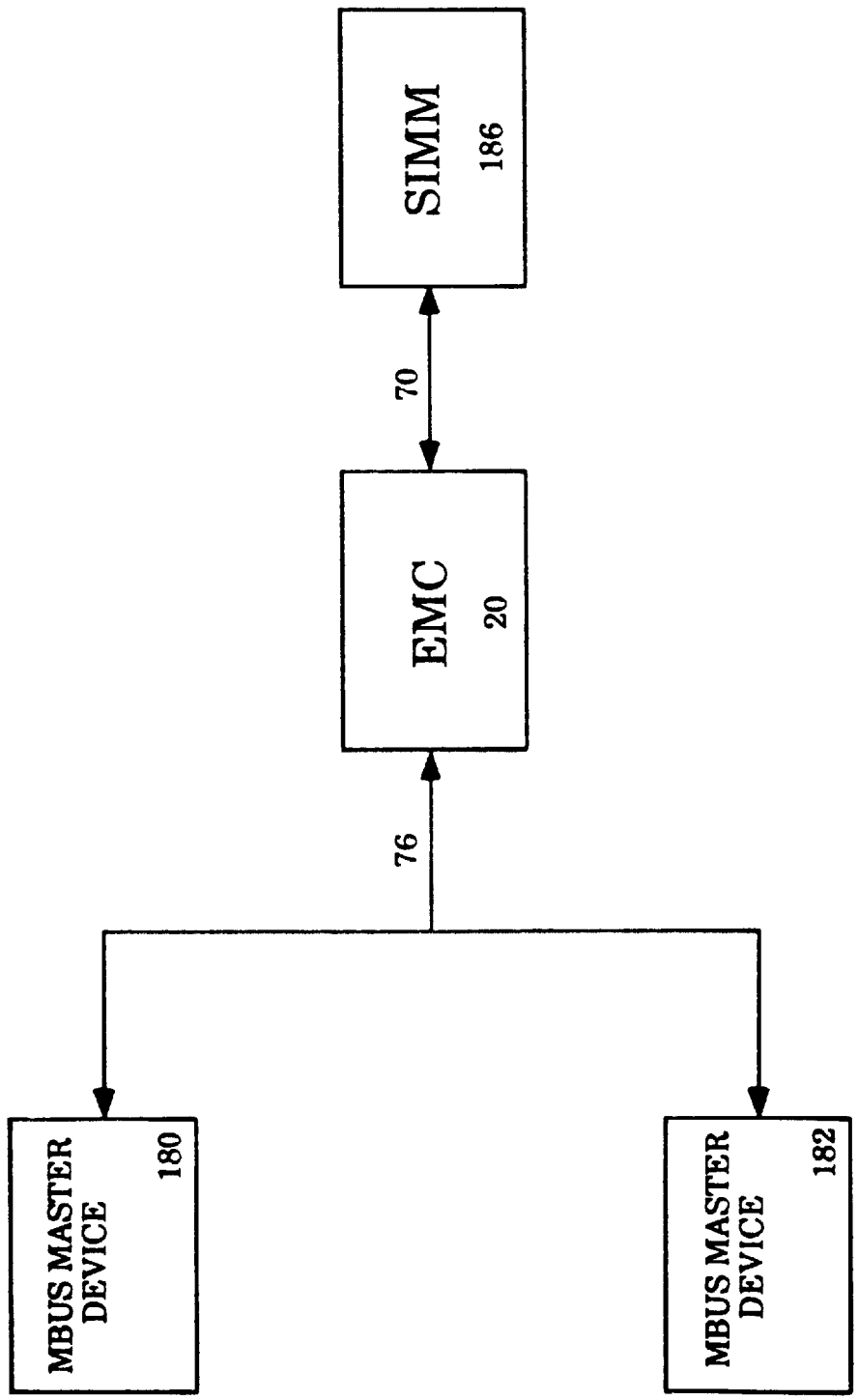
FIG. 4 illustrates master devices controlled by the memory controller of the present invention.

Referring now to FIG. 4, a typical system configuration for coherent operations is depicted. In FIG. 4, two multiprocessor bus master devices 180 and 182 and EMC 20 are coupled together by multiprocessor bus 76. Furthermore, the EMC 20 is coupled to a SIMM 186 by memory module bus 70. Multiprocessor bus master devices 180 and 182 could be either processors or I/O devices. There are two types of coherent operations in which the acknowledgment of the EMC can be programmably delayed. The first operation is a coherent read and the second is a coherent invalidate.

It is possible for device 180 to read a memory location of SIMM 186, modify the data stored in that location and then write the updated data back to the same location. However, it is also possible for device 182 to read the same memory location of SIMM 186, modify the data stored in that location and then write the updated data back to the same location. A problem would occur if device 182 read the same location on the SIMM 186, after device 180 had read it, but before device 180 had written the modified value back to the location. This is because when device 182 read the data stored in the location, it would not be reading the most recent version of the data.

To solve this problem, the protocol of the multiprocessor bus requires multiprocessor bus master devices, such as devices 180 and 182, to monitor all read operations to determine whether any memory locations which the devices are in the process of modifying are also being read by another device. When a first device detects an access by a second device to a location which the first device is modifying, the multiprocessor bus protocol requires the first device to assert a signal on the multiprocessor bus to stall the memory location access by the second device until the first device can update the location with the modified value. This stall signal must be asserted by the first device before the EMC acknowledges that the memory location is ready to be accessed.

Normally, a multiprocessor bus master device is fast enough to be able to stall the access to a SIMM before the EMC 20 can acknowledge that the memory location is ready to be accessed. However, there may be a case where a multiprocessor bus master device has a longer than normal latency characteristic. Such a device may not be fast enough to respond, and thereby stall an access by another multiprocessor bus master device, before the EMC 20 acknowledges. To prevent an error in that case, the present invention permits the acknowledgment of the EMC 20 to be programmed to delay longer than the time required to stall an access by the slowest multiprocessor bus master device coupled to the multiprocessor bus.

The other coherent operation is for coherent writes and it is called a coherent invalidate (CI) operation. A coherent invalidate operation does not actually transfer data. Instead, a coherent invalidate marks invalid a line of memory in the cache. Each multiprocessor bus master device may issue a coherent invalidate operation command. However, the cache controller, for the cache memory which contains the line to be marked invalid, actually performs the coherent invalidate operation.

If a first multiprocessor bus master device instructs a cache controller to void a line of memory that a second multiprocessor bus master device is using, the second multiprocessor bus master device must issue the CI instruction. Once again, the EMC 20 can be programmed to delay its acknowledgment of the CI to permit a slower than normal multiprocessor bus master device to record the CI command.

In both the coherent read and invalidate cases, the present invention permits the EMC acknowledgment window to be delayed by a programmably variable time period. In this way, the EMC 20 can be versatile enough to handle multiprocessor bus master devices with long latency characteristics. Therefore, multiple masters can be coupled to the multiprocessor bus, and if there are slow ones, the response of the EMC 20 can be programmably altered to slow down the system to match the latency of the slowest one. Thus, even slower processors are not excluded from being plugged into the multiprocessor bus.

By using an EMC 20 which is an ASIC, the EMC of the present invention includes functionality which maximizes the utilization of the processor and memory buses while relieving overhead burden of the processor. One such function provided by the EMC of the present invention is a circular write buffer.

The circular data queue buffers multiprocessor bus write operations. The write information (address and data) enters the queue from the multiprocessor bus and is distributed out across the memory module bus when the SIMM is available, e.g. not being locked out by other traffic on the memory module bus. In this way, the writes are distributed out as additional writes are queued up. Queuing writes as quickly as possible permits the processor bus to continue and thereby perform another transfer.

It is a characteristic of a read operation that, once an address to be read is specified, time must elapse while the specified location is accessed and the data retrieved. However, for a write operation the data to be written is known at the time of the transfer. Therefore, in the present invention, the EMC is equipped with a circular data queue and corresponding address queue that together form a circular write buffer. The circular write buffer can store data received by the EMC from the multiprocessor bus to be written to memory, until the memory module bus is free to transfer the data and the SIMM is ready to receive the data. This feature reduces the frequency with which the multiprocessor bus must stall while waiting for the memory module bus to dear when data is to be written to memory.

Thus, for example, a processor may attempt to write to a memory location which is unavailable because it is being refreshed. Without the circular data queue feature, before it could write to the location, the multiprocessor bus would have to stall while waiting for the memory location to be refreshed. However, with this feature, the circular data queue is able to retain the address to be written to and the data value to be written until the memory location is refreshed. So long as there is room in the queue, additional write operations may be added to the queue before the first write completes. Once writing can take place, ideally at a time that the memory module bus would otherwise be idle, the EMC controls the writing of the queued data. In the meantime, there is no need for the multiprocessor bus to stall pending the completion of a particular write operation. Therefore, utilization of both the multiprocessor bus and the memory module bus is increased.

Referring now to FIG. 5, one implementation of a circular write buffer 14 and its corresponding address queue 16 are illustrated. The dual request sixty-four byte write-buffer 14 is abstracted as an eight entry 14a–h circular data queue. Using this logical abstraction, data can be retrieved concurrently as it is pipe-line acknowledged. In this embodiment, write requests vary in size from a single byte to one-hundred and twenty-eight bytes. The nominal case transfer size is that of the cache lines (32 bytes). Thus, the 64 byte buffer employed is twice the size of the nominal case transfer. The 64 byte buffer width permits one to queue two 32 byte cache line flushes and then write them as the memory bus becomes available. Therefore, in capacity mode, the buffer can capture a single sixty-four byte transfer or two thirty-two byte transfers.

During a memory address phase (MAS) of a write operation, the address to be written to comes over the multiprocessor bus along with other information that identifies the format of the data to be written (e.g. planar or chunky VRAM, DRAM, Video I/O). Then, the circular data queue 14 stores the data to be written and queues it until the memory bus is free and the data can be written. Once the queue is full, then the EMC stalls the multiprocessor bus by not asserting an MRDY- signal. This signal causes the next data to be written to be held on the bus until the queue 14 is again available to accept the data.

A number of pointers are used by the circular data queue 14. There is a fill pointer which indicates the next byte location in the data queue to receive data from a write operation. There is also an unload pointer which indicates the next byte location in the circular data queue to provide data for a write operation. In this way, data is distributed out from the circular data buffer 14at the same time that other data enters buffer 14 using a first in-first out (FIFO) scheme.

The semantics of queues 14 and 16 are independent of buffer assignment, entry number, bus size and transfer size, thereby permitting the buffers to scale with additional buffers. The semantics for the control of the write buffer queue are:

| ADDRESS QUEUE: | | |
|---|---|---|
| aqld | IN | Load new address to next address buffer |
| aquld | IN | Increment the address unload pointer |
| aqfull | OUT | Address queue is full |
| aqne | OUT | Address queue is empty |
| DATA QUEUE: | | |
| dqld | IN | Load new data to next data buffer |
| dquld | IN | Increment the data unload pointer |
| dqflm1 | OUT | Data queue is one entry from being full |

Referring now to FIG. 6, eight SIMM slots (designated row 0 to row 7) are illustrated. In one embodiment of the present invention, the eight SIMM slots of FIG. 6 are coupled by a memory module bus to the EMC. An individual SIMM is coupled to the EMC through the memory module bus by being inserted into a slot. At any given time, any number of the slots in the system (from one to eight) can be populated by SIMMs.

A feature of the present invention is that the EMC can selectively perform refreshes of SIMMs coupled to the memory module bus. This feature removes the need for the processor to control refreshes of the memory modules, thereby relieving the overhead burden of the processor. The feature also increases multiprocessor bus utilization by eliminating the need for the multiprocessor bus to spend time transferring refresh signals between the processor and the EMC.

Furthermore, in the present invention, the EMC can be programmed to selectively refresh SIMMs coupled to the memory module bus so that it refreshes only those SIMMs that need to be refreshed. Moreover, the EMC can refresh multiple SIMMs simultaneously. Therefore, the memory module bus spends a minimum amount of overhead time transferring refresh signals between the EMC and the SIMMs, thereby increasing the utilization of the memory module bus.

Although the EMC can also be set to refresh the VSIMMs, the VSIMMs can refresh themselves, so the EMC does not have to refresh them. Similarly, a SSIMM (nonvolatile SIMM) is not a dynamic memory, so it too does not require refreshing. Thus, while DSIMMs must be refreshed, SSIMMs and VSIMMs need not be. Therefore, there can be multiple SIMMs, up to a capacity system, but only a need to refresh one or a few of the SIMMs. In one embodiment of the present invention, there are eight refresh bits (two hexadecimal digits) in the control status registers assigned to be programmed to indicate which slots are to be refreshed.

Therefore, in a configuration where only one SIMM had to be refreshed, the fact that only the SIMM in slot zero was to be refreshed could be indicated by setting the lowest bit of the refresh bits equal to one and the rest of the bits equal to zero (so that the refresh bits would have the value zero-one in hexadecimal). Then, the EMC would only refresh the first row (slot zero), and it would not attempt to refresh the other seven rows. Accordingly, if there were two SIMMs to be refreshed, one would set a different code in the eight refresh bits of the control status registers to direct the EMC as to which two SIMM rows were the ones that had to be refreshed.

The EMC can refresh two SIMMs simultaneously if the two SIMMs are located in adjacent slots. Therefore, if two SIMMs were to be refreshed, but one SIMM was in slot 0 and the other SIMM was in slot 7, they would both be refreshed on separate phases, because slots 7 and 0 are not part of a refresh pair. A more efficient way to configure the memory would be to place the SIMMs in slots which were part of the same refresh pair. Then, refresh cycles would not be wasted, because the control status register can be programmed such that the EMC would not perform the unnecessary refresh cycles. Without this feature in the EMC, there would be a waste of overhead and a reduction of performance caused by refreshing phantom memory in empty slots or by refreshing memory that does not need to be refreshed, since each refresh operation takes away from performance (i.e. the a number of clock cycles available for other operations). The EMC increases performance by only refreshing the devices that have to be refreshed.

The setting for the eight bit refresh indicator could be set manually as the system is configured. Alternately, the setting for the eight bit refresh indicator can be automatically determined by software in the system. The system can detect which SIMMs need refreshing and set the parameter automatically because there are only specific types of SIMMs available.

VSIMMs and DSIMMs have the same footprint in the memory module bus. While a multiprocessor bus master device initiates an access operation for a SIMM, any transfer to a SIMM is controlled solely by the EMC. The access initiation orders sent over the multiprocessor bus to the EMC have in their address packet an ID identifying what type of transfer is being performed (i.e. whether the transfer is a VRAM transfer, a Video I/O transfer or a DSIMM transfer). The EMC decodes the ID, then, depending on the value of the ID that came over the multiprocessor bus during the address phase, the EMC controls the transfer appropriately.

The memory module bus, on the other hand, does not have enough wires for each type of SIMM to provide the EMC with an ID coming back from the SIMM across the memory module bus to tell the EMC what type of SIMM is installed in a particular slot. This is because, in one embodiment of the present invention, the SIMMs were designed with a limited number (251) of signal pins to reduce cost. Because there were a limited number of signal pins, there simply were not enough signals available to have encoded IDs coming across the memory module bus from a SIMM.

Both VSIMMs and SSIMMs are much more complicated than DSIMMs and they have IDs which can be read by the EMC to identify their SIMM type. Therefore, VSIMMs and SSIMMs, can both be easily identified by their IDs. However, a DSIMM does not have an ID which the EMC can read across the memory module bus. Therefore, automatically identifying a slot containing a DSIMM is more difficult. Software can determine whether one of the slots contains a memory module by writing data to the slot and then reading the data back. If the slot is empty, the data which was written will not be readable. Moreover, if the slot contains a SIMM which is volatile (i.e. a DSIMM), and refresh is not enabled for the slot, the data stored in the SIMM will be readable immediately after writing, but after a certain amount of time, the data stored in the volatile SIMM will no longer be readable because the SIMM was not refreshed. So, by elimination, software can determine that the slot contains a DSIMM.

Furthermore, in the present implementation, there are four refresh phases. The EMC actually joins two adjacent rows at a time to refresh. The physical assignment from the middle of the motherboard to the end of the motherboard starts with slot zero and it goes down to slot seven. If two SIMMs to be refreshed are selectively placed in slots that are on the same refresh phase, the EMC will refresh both of the SIMMs at the same time. Alternately, if the SIMMs are placed in slots that are not part of the same refresh pair, they will be refreshed by the EMC sequentially.

In the embodiment of the present invention depicted in FIG. 6, the row address strobes are actually assigned in the order of zero, four, one, five, two, six, three and seven. This is because, in this embodiment, the video SIMMs can only be placed in certain slots because they have a different physical constraint than the other SIMMs. In this embodiment, while the video SIMMs fit in the same slot as other SIMMs, the VSIMMs hang out a little bit further than the other SIMMs. There is a special extended connector for the VSIMMs as well. However, it is only because of the cooling and spacing properties of the video SIMM boards that they are ordered this way in FIG. 6. In general, the physical ordering of the slots does not matter.

The EMC permits refreshes to be synchronized. This feature is activated by writing a value to a register within the EMC. Once a bit has been written to this location, the EMC will actually stall everything (e.g. read operations) until it can synchronize off this signal. The refresh synchronization feature is for testing purposes, to be able to have everything start off of the same clock pulse. Since there are four refresh cycles, the EMC will stall until the next of the four refresh cydes. Therefore, for a given read, the read would occur after the refresh cycle, and the location read would always have the same internal refresh count at the time of the read acknowledge.

The refresh synchronization feature helps in testing the EMC when using vectors to test the device. When testing using the vectors, a significant amount of other erroneous activity may happen before reaching the test sequence of interest. The refresh synchronization feature permits synchronization, so that when the test sequence of interest occurs, it will always cause the same predictable result.

The EMC supports both VSIMMs and DSIMMs being inserted interchangeably into the same memory module bus slots. Therefore, control lines of the memory module bus from the EMC to the SIMM slots must share many different signals. In one embodiment of the present invention, somewhere on the order of 100 signals have to be shared to be able to perform transfers to either type of SIMM in a given slot.

Unless one designs carefully, there is a liability to having a bus into which one can plug more than one type of device. There are several cases where there can be contention, which is when two output drivers drive the same signal at the same time. Each of the potential contention cases should have the possibility of contention eliminated. To accomplish this, the controls should be mutually exclusive, such that when performing a transfer to one device, there is not an enabling mode for another device.

For VSIMM slots, the EMC permits one to program in the control status register (CSR) the type of frame buffer possessed by a VSIMM populating a given VSIMM slot. The video configuration register (VCONFIG) specifies the configuration of the physical VSIMM RAS slots 4–7. The RAS-slot assignment is used for VSIMM frame buffer address shifting and to detect misreferenced slot errors. In one embodiment of the present invention, VCONFIG is an eight bit field with four sets of two consecutive bits specifying the configuration of an individual RAS slot according to the following scheme:

| VCONFIG value | Means |
| --- | --- |
| 0 | DRAM in slot or slot is empty |
| 1 | 128 bit 2 MB frame buffer VRAM |
| 2 | 128 bit 4 MB frame buffer VRAM |
| 3 | 256 bit 8/16 MB frame buffer VRAM |

Thus, VCONFIG can be programmed to indicate the frame buffer type for a VSIMM populating a given slot or to indicate that the slot is empty or contains a DSIMM. There is a default type for DRAM (or empty slots) which is programmed as zero. Each VSIMM has a video frame buffer. For VSIMMs, VCONFIG is programmed to be either one, two or three depending on whether the frame buffer is low-resolution, medium-resolution or high-resolution, respectively.

The following cases are the contention problems that would occur if a mismatch happens, i.e. they are anomalies caused by misreferenced slot multiprocessor bus transfers. The cases are induced by a system error or kernel level software. In each case, a safety measure is implemented in the EMC protocol to detect and avoid the problem. In one embodiment of the present invention, the safeties do not preclude the corner cases from corrupting memory, as can other undetectable system errors. They do, however, prevent permanent hardware failure and increase the system reliability.

The first case occurs when there is a Video I/O access, but the target is a DSIMM. In this case, the DRAM SIMM could drive the shared CBW bus. As a safety precaution, the DRAM is not CAS enabled to drive the data bus, and the unblocked RAS pulse width violates the DRAM specification. Thus, any future accesses to the corrupted DRAM will detect uncorrectable error (UE) faults.

The second case occurs when there is a VRAM access, but the target is a DSIMM. In this case, the DRAM could drive the shared D/CBW bus. As a safety precaution, the DRAM write enable (WE) is asserted during the access which prevents the DRAM from driving the data bus, and corrupts the location. This allows future DRAM accesses to detect the UE fault.

Finally, the third case occurs when there is a DRAM access, but the target is a VSIMM. In this case, the VRAM could drive the shared D bus. As a safety precaution, (RAM output enable) ROE is deasserted during a store to prevent the CBW read enabled VRAM from driving the data bus, and the write enabled VRAM induces a UE fault.

In each of the above three cases, if VCONFIG is programmed correctly, the slot error fault is recorded by the fault status registers (FSR) and fault address registers (FAR).

Furthermore, because the VCONFIG register of the control status register can be programmed to contain data as to whether a particular slot contains a DSIMM or VSIMM, the EMC can provide a slot error feature. The slot error feature performs a comparison between the type of access requested by a multiprocessor bus master device and the type of SIMM populating the slot to which the transfer is to be made. The appropriateness of the transfer is thereby verified. If the transfer type is inappropriate for the type of SIMM in the slot as specified by the contents of the VCONFIG register (e.g. a VRAM transfer to a slot containing a DSIMM), a slot error is detected, and the EMC asserts an access error signal line coupled to the multiprocessor bus master device. That way, if an errant process attempts to perform, either a DRAM transfer to a VSIMM or a VRAM transfer or video I/O transfer to DRAM, a slot error will result. The slot error is logged in the fault status registers (FSR) and the transfer is aborted by the multiprocessor bus master device.

The EMC controls the writing to SIMMs. When the EMC determines that data to be written is aligned consecutively along a row of a memory module, the EMC eliminates unnecessarily redundant row address strobe (RAS) signals. By doing this, the EMC reduces the overhead burden of the processor and also reduces the number of clock cycles necessary to write data across the memory module bus.

Normally, a DRAM transfer requires a RAS precharge cycle, (which involves deasserting RAS for three clock cycles). However, if successive transfers are on the same row, there is no need to deassert RAS and perform the three clock cycle precharge. The EMC can simply hold the RAS down and perform the next write cycle. Thus, if a series of DRAM address locations to be written to are row aligned, the EMC will eliminate consecutive address row address strobe (RAS) cycles.

There are cases, especially in VRAM traffic, where a lot of transfers are performed on the same row boundary. The EMC has an address comparator, that compares successive transfers to determine whether the next transfer is row aligned. If there is row alignment, the next transfer gets threaded onto the back of the previous transfer. In that case, the RAS is not changed and the column address strobe (CAS) is used to signal that the transfer has gone from one column to the next column in the row. Eliminating consecutive address RAS cycles permits the EMC to increase performance.

However, in one embodiment of the present invention, rather than three clock cycles being saved, only one clock is saved. In that embodiment, what is saved is not the precharge time, but the arbitration time, which is the time required to rearbitrate the state machine inside the EMC.

Theoretically, the process is fairly simple, the EMC simply compares the addresses as the transfers are going through, and suppresses the precharge cycle unless the addresses of the transfers change from one row to another row.

However, the problem is that the row boundaries are not necessarily uniform. Thus, in DRAM, there are many rows where the address gets shifted around. Furthermore, each slot can contain one of several types of DRAMs and each slot can be can be programmed differently depending upon the type of DRAM it contains. The row boundaries for each type of transfer, and how each slot is programmed, is defined as a function of the state machine. Depending on what type of transfer is being performed, and what type of device is being transferred to, the EMC state machine determines which bits to be written reside on the same row.

Referring now to FIG. 7, the row assignments for the various SIMM configurations of one embodiment are depicted. That is, FIG. 7 shows how the row addresses differ among different SIMM devices. For example, a comparison between the 4 MB VRAM and the 64 MB DRAM SIMMs shows that the row addresses for the two devices are very similar. The only difference between the two SIMMs is that the 64 MB DRAM has additional bits which the 4 MB VRAM does not have. In this case, there is no problem when calculating row transitions for addresses for the two types of SIMMs because the additional bits of the 64 MB DRAM can be ignored. However, for the other SIMMs, the memory address definitions are radically different.

While FIG. 7 depicts basically three different types of video buffers, as will be described below in connection with FIGS. 8a–c, in a planar video transfer the address calculations are more complicated because the address actually gets shifted either once, or twice, depending on whether the data is being expanded out to twice as much space or four times as much space. Thus, the address gets shifted once for 16 bit pixels and a second time for 32 bit pixels.

Next, referring to FIGS. 8a–c, the EMC can translate data transfers from one of several specialized formats to other specialized formats so that the multiprocessor and memory module buses are utilized efficiently and the overhead burden on the processor is relieved.

For video data transfers, the multiple data format capability of the EMC permits video data to be transferred across the multiprocessor bus to the EMC in a compressed format. The EMC then expands the compressed video data before it is stored in a memory module. Then, when the data is retrieved, the EMC recompresses it before sending it across the multiprocessor bus to the requesting processor. Not only is the amount of data to be transmitted across the multiprocessor bus reduced, but the overhead burden on the processor is relieved because there is no need for the processor to perform read-modify-write operations to store the video data.

In one embodiment of the present invention, video transfers can be performed formatted as "chunky" or "planar" transfers. A chunky transfer is basically a standard pixel transfer. That is, when simply displaying a lot of pixels, one would perform a chunky transfer to VRAM, as one would perform a memory transfer to DRAM. A typical full color machine has 32 bit pixels. One embodiment of the EMC supports operations that have been optimized for 32-bit pixel transfers. Referring now to FIG. 8a, typical color pixels are depicted. A typical 32 bit pixel has four eight bit fields (blue (B), green (G), red (R) and window ID (X)). The window ID field is used to modify the individual pixel, on a pixel-by-pixel basis, based on the desired characteristics of a given window on the display. This pixel modification is carried out by the VSIMM frame buffer itself. Note that the (X), (B), (G), and (R) fields may also be used individually as inputs to color maps, depending on the window ID value (X) of the pixel. For chunky transfers, these four fields are the different fields for a transfer.

The four fields of a 32 bit pixel are simply different fields of memory allocated for VRAM. Therefore, if one wanted to lower the red portion of a pixel being displayed, they would decrease the (R) field. Conversely, if one wanted to add more blue to a pixel, they would increase the (B) field value. Additionally, if they changed the (X) field value, they would alter the individual pixel based on characteristics programmed into the ASICs of the VSIMM frame buffer.

In a chunky transfer, a whole 32 bit pixel block is transferred. Therefore a chunky transfer is performed just like a normal word transfer to DRAM would be. However, in the present invention, there is a variant of a chunky transfer, which is called a BGR transfer. The BGR transfer is used if one wants to keep the same window ID, but wants to change the color of the pixel. Unlike a standard chunky transfer, a BGR transfer only updates the three BGR components of a pixel and does not affect the window ID (X) value.

Referring now to FIG. 8b, examples of standard chunky and BGR chunky transfers are depicted. In the examples of FIG. 8b, in both cases the value before transfer of a pixel to be written to is YABC such that, before the transfer, the (X) value of the pixel is Y and the (B), (G), and (R) component values are A, B and C respectively. If the value of the pixel is updated by writing ZDEF (i.e. such that the (X) value of the pixel is Z and the (B), (G), and (R) component values are D, E and F respectively) in a standard chunky transfer, the new value of the pixel would be ZDEF. However, in a BGR chunky transfer, if the value of the pixel is updated by writing ZDEF, then the window ID part of the value (Y) would not be updated. Thus, after the BGR chunky transfer, the pixel would have the value YDEF (i.e. a different color but the same window ID).

The BGR chunky feature saves a lot of compute time in software for the processor because, otherwise, the processor would have to perform a read-modify-write operation to mask the new value (ZDEF) into the old value (YABC). That is, the processor would have to actually read the old value of the pixel to determine what its old window ID value was. Then, the processor would mask the old value (YABC) into the new value (ZDEF) that is going to update the (B), (G) and (R) fields, and finally, write back out the result (YDEF). Therefore, the chunky BGR transfer permits a lot of processor performance to be saved and also reduces the amount of data to be transferred across the multiprocessor bus, thereby increasing its utilization efficiency.

Since the window ID field is not changed in a chunky BGR operation, it would be possible to compress the data, so that instead of the transfer being 32 bits, it would only be 24 bits. However, in one embodiment of the present invention, there is no compression in the BGR chunky mode. This is because to do so would result in an odd (3) rather than even (4) number of fields being updated. Still, the BGR transfer scheme is faster than transferring only three bytes at a time, or than performing a read-modify-write operation.

While chunky transfers are basically standard data transfers, "planar" transfers, on the other hand, use compression and decompression. Referring again to FIG. 8a, in addition to the 32 bit XBGR pixel format, there is also a 16 bit XC pixel format. In a typical 16 bit pixel, there is an 8-bit window ID field (X) which is the same as the (X) field in the 32 bit formatted pixels. However, there is also an 8-bit color field (C) which represents values in a color map.

An example of using the planar packing transfer would be a planar write for a series of eight consecutive 16 bit pixels where only the (X) field was to be updated for each pixel. In that case, the processor sends the X channel update information for the eight pixels across the multiprocessor bus in one double word transfer as depicted in FIG. 8c. The unchanging C channel information would have been stripped from each of the eight 16 bit XC pixels by the processor before the transfer and only the X channel information would be packed into the double word to be transferred across the multiprocessor bus. An individual double word transfer would take four cycles on the multiprocessor bus. Obviously, in a C channel transfer, one strips the X channel information from eight consecutive pixels and only the (C) field for the pixels is transferred across the multiprocessor bus.

Furthermore, in the 32 bit XBGR format, even greater efficiencies can be realized by planar transfers. For 32 bit pixels, in addition to an X channel planar transfer for eight consecutive 32 bit pixels, there are also B, G and R channel planar transfers. In each transfer, eight pixels can have one channel updated in one double word transfer across the multiprocessor bus. This provides a four-to-one data packing over the multiprocessor bus for 32 bit pixel writes, whereas the 16 bit planar transfer only provides a two-to-one data packing.

The planar transfer feature provides a very high bus utilization on the multiprocessor bus because more data is transferred across the multiprocessor bus in fewer cycles. Furthermore, processor performance increases dramatically because the processor does not have to perform a read-modify-write operation or do any additional computation in order to mask the data.

A planar read operation is just the opposite of a planar write operation. Thus, in a planar read operation, data are read across the memory module bus from memory in an unpacked format and then packed into a planar format by the EMC before being sent across the multiprocessor bus. So, for example, the processor would request a double word X channel read in planar mode for eight consecutive XBGR formatted 32 bit pixels. The EMC would subsequently have to actually read 32 bytes across the memory module bus, pack the 32 bytes read to the desired 8 bytes of data, and then send the requested 8 bytes across the multiprocessor bus to the processor. Like planar writes, planar reads also relieve some of the processing burden of the processor and increase the bus utilization for the multiprocessor bus.

The EMC performs a different format translation for non-video data. For non-video data, the EMC adds error correcting check bits to the data before writing it to a SIMM. The EMC then uses the check bits to verify that correct data are retrieved from the memory modules. The EMC uses an error detection and correction mechanism that permits the EMC to detect errors on nibble boundaries and also to correct single-bit errors. By placing the error detection functionality in the EMC, the amount of data to be transferred across the multiprocessor bus is reduced and the processor is relieved of the overhead burden associated with applying the error detection and correction algorithm.

The EMC has an error correction code (ECC) scheme implementation. The scheme is based on Single-Bit Error Correcting—Double Bit Error Detecting—Single burst (nibble) Error Detecting codes (SEC-DED-SbED codes) described in a paper entitled "A Class of Odd-weight-Column SEC—DED—SbED Codes for Memory System Applications", by Shigeo Kaneda, IEEE Transactions on Computers 0018-9340/84/0800-0737501.00 (1984).

The Kaneda code implemented in one embodiment of the present invention is a single-bit error correction—double-bit error detection and 4-bit error detection scheme. In the unlikely event that there is a three bit error, the Kaneda code can only detect it as long as it occurs on a nibble boundary. Still, the Kaneda ECC scheme can detect all 3 and 4 bit errors on a nibble boundary.

The Kaneda ECC scheme is optimized to chip level error detection. The principal advantage of using the Kaneda ECC scheme is that it can detect an error on a nibble boundary. A nibble is four bits, therefore, in one embodiment of the present invention, a nibble has the same width as a single memory location on a DRAM. While most ECC schemes can only detect one erroneous bit and not an error on a nibble boundary, the Kaneda ECC scheme can detect a total failure of any single DRAM chip. Thus, if a whole DRAM chip malfunctions, the other schemes may detect the chip as still being good, but the Kaneda ECC scheme will detect the chip malfunction. Once a faulty syndrome is latched in the Fault Status Registers (FSR) of the EMC, the faulty syndrome can be used by system software as the index into a 256 entry syndrome table to determine the single bit error location or multiple bit error type. The syndrome decode table is depicted in FIG. 9.

The EMC also provides further diagnostic capability by permitting the reading and writing of the extra bits used by the Kaneda ECC scheme. For every line of data (8 bytes or 64 bits) to be stored in a DRAM, there is a corresponding byte (8 bits) of check bits. The check bits are used to insure the integrity of the data from the EMC to the SIMM and back. In one embodiment of the present invention, the multiprocessor bus is only 64 bits (8 bytes) wide. Therefore, once the check bits have been read across the memory module bus and used by the ECC scheme of the EMC to verify the accurateness of their corresponding data line, the check bits are stripped off the data line by the EMC. Subsequently, during a DRAM read operation, only the 64 bits of data originally written to the data line by the processor are sent back to the processor across the multiprocessor bus by the EMC.

Yet another feature of the ECC scheme of the present invention is that it provides an additional diagnostic capability by permitting the control of check bit values to be written. Thus, one can actually read and write the check bits of a DRAM line, and thereby test the machine to make sure that read and write operations are functioning properly. If a failure is detected, the feature permits one to isolate the failure.

The EMC reads and writes the information in a memory line (including the check bit byte) and uses the check bit byte information to detect failures in the DSIMM. Thus, the EMC can detect failures in the data or in the check bits. When it finds a failure, it logs those failures in the control status registers. The EMC has a series of diagnostic tests. When a software diagnostic tries to isolate a problem, it will read and write the check bits to determine whether there is a hard bit error or soft bit error. With this feature, the EMC can actually perform full testing of the 8 check bit locations in a memory line of a DSIMM, just as it can perform full testing of the 64 bit data part of the memory line.

There is a byte in the control status register that stores the value that is written to, and another byte that stores the value that is read from, the check bit part of a DRAM line. Thus, there are two bytes in the CSR used by the ECC, one is for writing to, and one is for reading from, the check bit part of a line.

In one embodiment of the present invention, there is no way to turn off the ECC scheme for write operations. The EMC will always write ECC bits to the check bit portion of a DRAM line. However, in one embodiment of the current invention, in addition to the normal ECC mode for storing DRAM lines, there is an ECC diagnostic mode which is entered by the processor setting a single bit (the DMODE bit). When the EMC is placed in the diagnostic mode, the EMC suspends writing the check bits generated by the ECC scheme to the check bit byte of a DRAM line and instead writes a value which has been stored in an eight bit register (SYNCH CB) of the EMC.

The SYNCH CB check bits are for writing, and then, when they are read back, the bits are stored in the fault status register. In one embodiment of the present invention, the check bits are read back, but they are not automatically compared. It is left to software to perform the comparison. The DMODE feature allows one to be able to observe and to set check bits to a known value. The DMODE function is helpful in isolating malfunctioning check bit regions of a DRAM line. If the DMODE feature were not present, one would not be able to set the check bits because usually the check bits are set according to the coding scheme based on the value of the data to be stored in the corresponding portion of the DRAM line.

Figure 10:
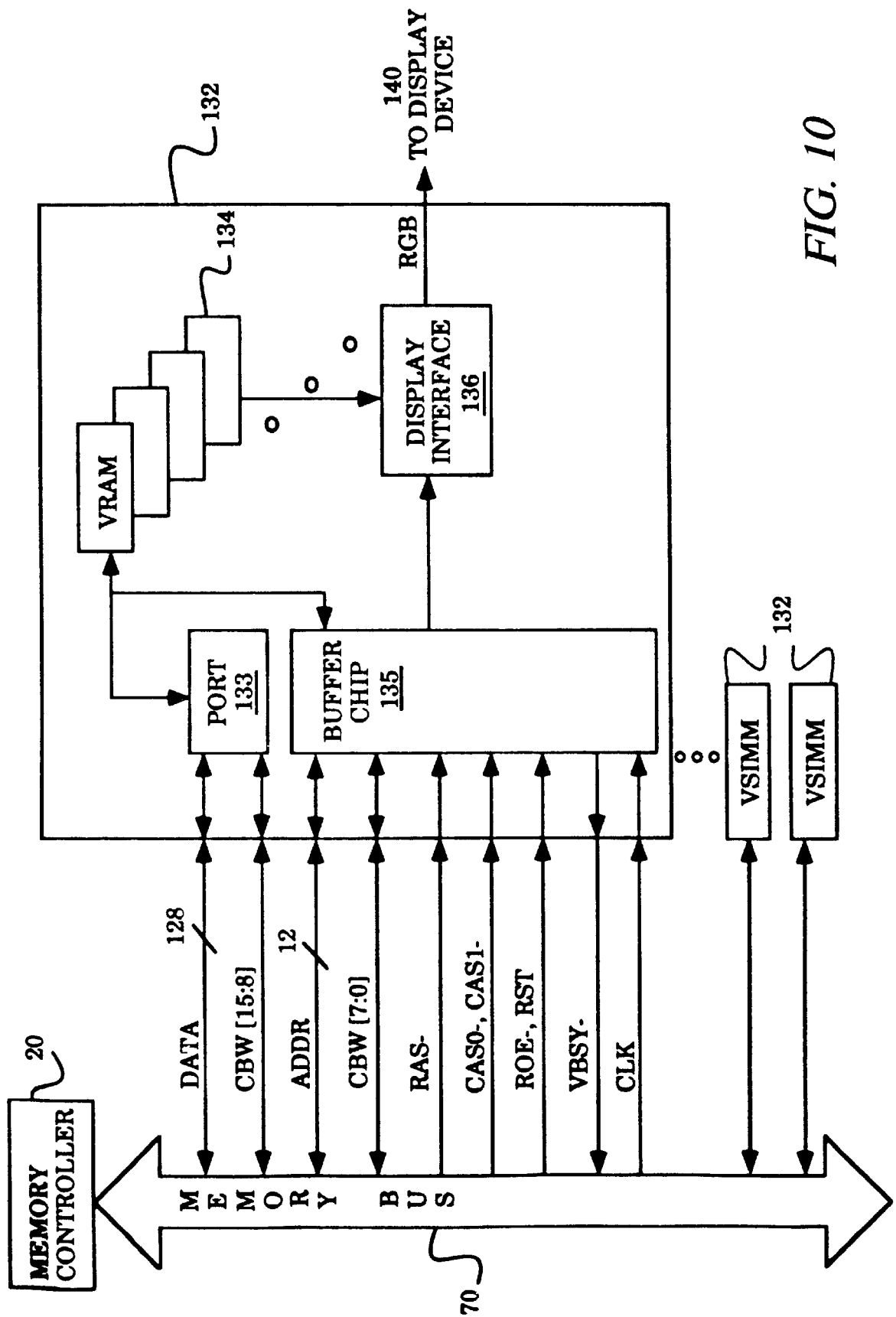
FIG. 10 illustrates a block diagram of a video SIMM coupled to the memory controller of the present invention.

For video memory modules which have video input/output (V I/O) ports, the EMC translates the V I/O signals which it receives from the multiprocessor bus to V I/O signals which exploit the capability of the memory module bus. Referring now to FIG. 10, the coupling of a plurality of VSIMMs 132 to EMC 20 by memory module bus 70 is depicted.

Thus, the EMC 20 can also control transfers for video I/O. In the previous chunky and planar transfer examples, the chunky and planar transfers were actually transfers to RAM (albeit video RAM). However, a VSIMM 13 may actually have two video I/O ports. The first video RAM port 133 is a port to which the EMC writes and from which it reads video data. The EMC cannot directly access the second port 140. The second port 140 is a display port from which the video may be sent to a monitor (not shown) or other display device attached to the port.

With video I/O, there are several devices on the VSIMM 132 to support the video RAMs. Thus, while the VSIMM has mostly banks of VRAM 134, it also has a Video Buffer Chip (VBC) 135 and other devices comprising display interface 136.

The VBC 135 synchronizes three operations to make the VSIMM 132 device independent from the EMC 20. First, VBC 135 can control the refreshes for the VRAM 134 populating the VSIMM 132. Secondly, VBC 135 physically buffers control signals from the memory module bus 70 to reduce the loading on the memory module bus 70. Third, VBC 135 controls reload transfers for the VSIMM 132. That is, when the VSIMM 132 is drawing, and the frame buffer is at the end of the VRAM's serial port memory line, a reload transfer updates the address pointer so that the frame buffer receives the next VRAM serial port memory line to display.

An advantage of having VBC 135 locally control the refresh of VRAMs 134 is that doing so relieves EMC 20 from having to provide refresh to VSIMM 132. This frees the EMC 20 to perform other functions instead of refresh. Another advantage is that no refresh commands must be sent across memory bus 70 between EMC 20 and VSIMM 132. Therefore, having VBC 135 located upon VSIMM 132 also reduces the amount of information that has to be passed across the memory bus 70, thereby freeing the memory bus 70 to be used to transfer other signals.

In one embodiment of the present invention, the EMC 20 can override the local refresh function of VBC 135 to remotely perform refreshes of the VRAMs 134 located on VSIMM 132. However, generally, for the above reasons, it is better if refreshes of the VRAMs 132 are controlled locally by the VBC 135 on the VSIMM 132. Thus, if the VBC 135, and not the EMC 20, is refreshing the VRAMs on the VSIMM 135 and a different SIMM is available which also needs to be accessed by the EMC 20, then the EMC 20 can access the other SIMM, while the first SIMM is being independently refreshed.

Display interface 136 is comprised of three components that provide support for the display port 140. There is a digital analog converter (DAC), a program dock generator (PCG) and a memory display interface (MDI). The DAC takes a digital video signal provided by the MDI and generates an analog signal for display through port 140.

The MDI has color look-up tables, can blend colors and can provide color mappings, thereby permitting display colors to be indirectly mapped. The PCG, on the other hand, controls a clock frequency for the monitor to which the analog signal is being scanned. Thus, programming the PCG sets the clock frequency.

The only coupling to the rest of the system for the VBC 135 and the devices of the display interface 136 is through the EMC 20. Therefore, not only does the EMC 20 control chunky and planar transfers to the VRAM 134 of VSIMM 132, but it also controls accesses to the other devices on the VSIMM. Most of the transfers controlled by the EMC 20 to the devices are standard transfers, (i.e. for a write operation, send in the address and then send in and write the data; or for a read operation, send in the address and then read back the data stored at that address).

However, in one embodiment of the present invention, the MDI has speed constraints, so special autoincrement transfers are generated by the EMC 20 and sent to the MDI over memory module bus 70. In autoincrement transfers, the MDI stores the address that was last sent to it. On each successive transfer, the address increments. Therefore, because the address simply increments, there is no need to send the next address across the memory bus 70 on every transfer. The autoincrement format permits more transfers to the MDI in a given amount of time, thereby more efficiently using the 8-bit V I/O channel.

While the method of the present invention has been described in terms of its presently preferred and alternate embodiments, those skilled in the art will recognize that the method of the present invention is not limited to the embodiments described. The method of the present invention may be practiced with modification and alteration within the spirit and scope of the appended claims. The specifications and drawings are, accordingly, to be regarded in an illustrative rather than a restrictive sense.

What is claimed is:

1. A memory controller, comprising:
   a memory module access controller, controlling access to a plurality of memory modules, each of the memory modules having an associated type; and
   a configuration status register, storing configuration status information indicating the associated type for each of the memory modules, the memory access controller controlling access to each memory module type, wherein if an access operation is performed to a wrong type, uncorrectable error faults are generated and can be detected, wherein if a video input/output access is performed to a dynamic random access memory (DRAM) type of memory module coupled to the memory controller through a bus, the memory module access controller will respond to the video input/output access to the DRAM type of memory module wherein the DRAM type of memory module is: (1) prevented from being column address strobe (CAS) enabled to drive the bus, and (2) allowed to generate an row address strobe (RAS) pulse width that violates operating parameters for the DRAM type of memory module,
   if a video random access memory (VRAM) access is performed to the dynamic random access memory (DRAM) type of memory module, the memory module access controller will respond to the VRAM access to the DRAM type of memory module wherein write enable is asserted to the DRAM type of memory module, and
   if a dynamic random access memory (DRAM) store access is performed to a video type of memory module, the memory module access controller will respond to the DRAM store access to the video type of memory module wherein RAM output enable (ROE) is deasserted.

2. A memory controller method, comprising the steps of:
   indicating to a refresh controller of any specific memory modules of a plurality of memory modules to be refreshed and thereby selectively controlling which of the memory modules are refreshed by the refresh controller;

controlling access to the plurality of memory modules, each of the memory modules having an associated type; and storing configuration status information indicating the associated type for each of the memory modules wherein if an access operation is performed to a wrong type, uncorrectable error faults are generated and can be detected, wherein if a video input/output access is performed to a dynamic random access memory (DRAM) type of memory module, the video input/output access to the DRAM type of memory module will be controlled wherein (1) the DRAM type of memory module is not column address strobe (CAS) enabled to drive a bus coupling the memory controller to the DRAM type of memory module, and (2) an unblocked row address strobe (RAS) pulse width is generated that violates operating parameters for the DRAM type of memory module, if a video random access memory (VRAM) access is performed to a dynamic random access memory (DRAM) type of memory module, the VRAM access to the DRAM type of memory module will be controlled wherein write enable is asserted to the DRAM type of memory module, and if a dynamic random access memory (DRAM) store access is performed to a video type of memory module, the DRAM store access to the video type of memory module will be controlled wherein RAM output enable (ROE) is deasserted.

3. A memory controller, comprising:

a planar data packer to receive a plurality of unpacked video data from a memory device, each of the unpacked video data having at least two channels of information, and to pack the unpacked video data into packed video data by stripping at least one channel from each of the plurality of unpacked video data and then combining any remaining unstripped channel data, prior to sending the packed video data to a bus master;

a planar data unpacker to receive the packed video data from the bus master, the packed video data having at least one missing channel of the at least two channels of the unpacked video data, the planar data unpacker then unpacking the packed video data to unpacked video data for storage in the memory device; and an error correction code (ECC) generator to generate ECC information to be appended to non-video data received from the bus master prior to sending the non-video data to the memory device, and to generate check ECC data to be compared with the ECC information appended to the non-video data received from the memory device prior to sending the non-video data to the bus master.

4. The memory controller as set forth in claim 3 wherein the ECC information to be appended to the non-video data can be inspected prior to sending the non-video data to the memory device and can be inspected after the non-video data has been received from the memory device.

5. The memory controller as set forth in claim 3 wherein override ECC information can be appended to the non-video data, in place of the ECC information generated by the ECC generator, prior to writing the non-video data to the memory device.

6. The memory controller as set forth in claim 3 wherein comparison of the check ECC data to the ECC information appended to the non-video data can be turned off.

7. A memory controller method, comprising the steps of:

planar data packing by receiving a plurality of unpacked video data from a memory device, each of the unpacked video data having at least two channels of information, and packing the unpacked video data into packed video data by stripping at least one channel from each of the plurality of unpacked video data and then combining any remaining unstripped channel data, prior to sending the packed video data to a bus master;

planar data unpacking by receiving the packed video data from the bus master, the packed video data having at least one missing channel of the at least two channels of the unpacked video data, and then unpacking the packed video data to unpacked video data for storage in the memory device, thereby providing video data translation;

generating error correction code (ECC) information to be appended to non-video data received from the bus master prior to sending the non-video data to the memory device; and generating check ECC data to be compared with the ECC information appended to the non-video data received from the memory device prior to sending the non-video data to the bus master.

8. The memory controller method as set forth in claim 7, further comprising the steps of:

inspecting the ECC information to be appended to the non-video data prior to sending the non-video data to the memory device;

inspecting the ECC information appended to the non-video after the non-video data has been received from the memory device.

9. The memory controller method as set forth in claim 7, further comprising the step of:

appending override ECC information to the non-video data, in place of the ECC information generated by the ECC generator, prior to writing the non-video data to the memory device.

10. The memory controller method as set forth in claim 7 wherein comparison of the check ECC data to the ECC information appended to the non-video data can be turned off.

11. A memory controller comprising:

a circular write buffer including a data queue storing all data to be written to a memory device, the data queue having a plurality of entries wherein at least two of the entries are combined to store a single datum, the single datum being larger than a single entry of the entries, and an address queue storing addresses associated with the stored data of the data queue;

a refresh controller to control refresh of a plurality of memory modules;

a control status register to indicate to the refresh controller of any specific memory modules of the plurality of memory modules to be refreshed and selectively control which of the memory modules are refreshed by the refresh controller;

a memory module access controller, controlling access to the plurality of memory modules, each of the memory modules having an associated type;

a configuration status register, storing configuration status information indicating the associated type for each of the memory modules, the memory access controller controlling access to each memory module type, wherein if an access operation is performed to a wrong type, uncorrectable error faults are generated and can be detected; and a video data translator having a planar data packer to receive a plurality of unpacked video data from the memory device, each of the unpacked video data having at least two channels of information, and to pack the unpacked video data into packed video data by stripping at least one channel from each of the plurality of unpacked video data and then combining any remaining unstripped channel data, prior to sending the packed video data to a bus master, the video data translator also having a planar data unpacker to receive the packed video data from the bus master, the packed video data having at least one missing channel of the at least two channels of the unpacked video data, the planar data unpacker then unpacking the packed video data to unpacked video data for storage in the memory device.

12. A memory controller method comprising the steps of:

storing all data to be written to a memory device in a data queue, the data queue having a plurality of entries wherein at least two of the entries are combined to store a single datum, the single datum being larger than a single entry of the entries and storing addresses associated with the stored data of the data queue in an address queue, thereby providing a circular write buffer;

storing information indicating to a refresh controller of any specific memory modules of a plurality of memory modules to be refreshed to selectively control which of the memory modules are refreshed by the refresh controller;

controlling access to the plurality of memory modules, each of the memory modules having an associated type; and storing configuration status information indicating the associated type for each of the memory modules wherein if an access operation is performed to a wrong type, uncorrectable error faults are generated and can be detected;

planar data packing by receiving a plurality of unpacked video data from the memory device, each of the unpacked video data having at least two channels of information, and packing the unpacked video data into packed video data by stripping at least one channel from each of the plurality of unpacked video data and then combining any remaining unstripped channel data, prior to sending the packed video data to a bus master; and planar data unpacking by receiving the packed video data from the bus master, the packed video data having at least one missing channel of the at least two channels of the unpacked video data, and then unpacking the packed video data to unpacked video data for storage in the memory device, thereby providing video data translation.

* * * * *